(12) United States Patent
Hassan Hussein et al.

(10) Patent No.: US 10,966,098 B2
(45) Date of Patent: Mar. 30, 2021

(54) WIRELESS COMMUNICATIONS ENTITIES USING SWEEPING TONE TO EFFICIENTLY COEXISTING

(71) Applicant: Fraunhofer-Gesellschaft zur Foerderung der angewandten Forschung e.V., Munich (DE)

(72) Inventors: Khaled Shawky Hassan Hussein, Erlangen (DE); Rohit Datta, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/694,452

(22) Filed: Nov. 25, 2019

(65) Prior Publication Data
US 2020/0100117 A1    Mar. 26, 2020

Related U.S. Application Data

(63) Continuation of application No. PCT/EP2018/063810, filed on May 25, 2018.

(30) Foreign Application Priority Data

May 26, 2017   (EP) .................................... 17173048

(51) Int. Cl.
*H04W 16/14*   (2009.01)
*H04B 17/345*  (2015.01)
(Continued)

(52) U.S. Cl.
CPC .......... *H04W 16/14* (2013.01); *H04B 1/1036* (2013.01); *H04B 17/345* (2015.01);
(Continued)

(58) Field of Classification Search
CPC ..... H04W 16/14; H04W 52/16; H04W 52/18; H04W 52/06; H04W 52/228;
(Continued)

(56) References Cited

U.S. PATENT DOCUMENTS 4,907,293 A * 3/1990 Ueno
6,704,378 B2 * 3/2004 Jagger et al.
(Continued)

FOREIGN PATENT DOCUMENTS

KR   20080018813 A   2/2008
KR   20160078427 A   7/2016

OTHER PUBLICATIONS

Chandra, Ranveer, et al., "A case for adapting channel width in wireless networks", Computer Communication Review; vol. 38; No. 4; Oct. 1, 2008; pp. 135-146; Seattle, WA.

*Primary Examiner* — Meless N Zewdu
(74) *Attorney, Agent, or Firm* — Michael A. Glenn; Perkins Coie LLP

(57) ABSTRACT

An apparatus is configured to operate in a wireless communications network cell that is operated so as to provide a first transmission band and a second transmission band being separated by a narrow band. The apparatus is configured to transmit a data signal using a frequency band having a center frequency. The center frequency is a frequency of the narrow band. The apparatus is configured to transmit an indicator signal in the frequency band prior to transmitting the data signal so as to indicate the transmission of the data signal.

27 Claims, 8 Drawing Sheets

(51) Int. Cl.
*H04B 17/354* (2015.01)
*H04B 1/10* (2006.01)
*H04L 1/00* (2006.01)

(52) U.S. Cl.
CPC ........... *H04B 17/354* (2015.01); *H04L 1/003* (2013.01); *H04B 2001/1045* (2013.01)

(58) Field of Classification Search
CPC ... H04W 88/00; H04W 88/02; H04W 72/085; H04W 72/082; H04W 88/08; H04L 1/00; H04L 1/003; H04L 1/0026; H04B 1/00; H04B 17/345; H04B 17/354; H04B 1/1036; H04B 2001/1045; H04B 1/525; H04B 17/327; H04B 17/30; H04B 17/373; H04B 17/382; H04B 2201/71307; H04B 2201/71315; H04B 2201/709709; H04B 2201/709718; H04B 2215/00; H04B 15/00; H04B 15/005; H04B 1/7097; H04B 1/71; H04B 1/7103; H04B 1/10; H04B 1/06

See application file for complete search history.

(56) References Cited

U.S. PATENT DOCUMENTS

| | | | |
|---|---|---|---|
| 7,194,050 B2* | 3/2007 | Nicholls et al. | 375/346 |
| 7,518,524 B1 | 4/2009 | Aiello et al. | |
| 8,744,513 B2* | 6/2014 | Chen et al. | 455/522 |
| 2005/0164665 A1* | 7/2005 | Suganuma | 455/278.1 |
| 2006/0188003 A1 | 8/2006 | Larsson | |
| 2010/0128679 A1 | 5/2010 | Kwon | |
| 2010/0142605 A1 | 6/2010 | Chamberlain | |
| 2012/0288043 A1* | 11/2012 | Chen et al. | 375/345 |
| 2012/0295604 A1 | 11/2012 | Gunzelmann | |
| 2013/0010716 A1* | 1/2013 | Dinan | 370/329 |
| 2015/0189518 A1 | 7/2015 | Faerber | |
| 2016/0242183 A1* | 8/2016 | Kang et al. | H04W 72/0453 |
| 2017/0265193 A1* | 9/2017 | Wang et al. | H04W 72/0453 |

* cited by examiner

US 10,966,098 B2

WIRELESS COMMUNICATIONS ENTITIES USING SWEEPING TONE TO EFFICIENTLY COEXISTING

CROSS-REFERENCES TO RELATED APPLICATIONS

This application is a continuation of copending International Application No. PCT/EP2018/063810, filed May 25, 2018, which is incorporated herein by reference in its entirety, and additionally claims priority from European Application No. EP 17173048.4, filed May 26, 2017, which is incorporated herein by reference in its entirety.

The present invention concerns the field of wireless communication and, more specifically, apparatuses configured to operate in a wireless communications network cell, a base-station configured to operate a wireless communications network cell, a wireless communications network, methods for operating the same and to a non-transitory computer program product. The invention further relates to a narrow-band sweeping tone for coexistence of critical transmission.

BACKGROUND OF THE INVENTION

There may exist requirements to have transmission-critical and/or ultra-reliable low-latency communication (URLLC) narrow-band devices that transmit spontaneously together with coexisting wide-band network without significant interference to the data operation. Additionally, these narrow-band devices have to be protected from unwanted interference from the wide-band primary network. This may be an important requirement to keep the URLLC as robust as possible. There may exist solutions that allow for having a valid transmission at the guard bands using narrow-band signals. When transmitting in the guard band, there has to be a reduced Adjacent Channel Leakage Ration (ACLR) using sharp filters. Accordingly, there exist concepts for an ACLR reduction and sharp band waveform design. Narrow-band signals may be transmitted in the guard bands. The guard bands may be reused in time and/or frequency. There may exist interference detection techniques that allow for detection of interference in such a guard band.

There is a need to enhance efficiency of wireless communications resources.

SUMMARY

An embodiment may have an apparatus configured to operate in a wireless communications network cell that is operated so as to provide a first transmission band and a second transmission band being separated by a narrow band; or wherein the narrow band is arranged adjacent to the first or second transmission band; wherein the apparatus is configured to transmit a data signal in the narrow band using a frequency band having frequencies of the narrow band; wherein the apparatus is configured to transmit an indicator signal in the frequency band prior to transmitting the data signal so as to indicate the transmission of the data signal.

Another embodiment may have an apparatus configured to operate in a wireless communications network that is operated so as to provide a first transmission band and a second transmission band being separated by a narrow band; or wherein the narrow band is arranged adjacent to the first or second transmission band; wherein the apparatus is configured to reduce a channel leakage ratio to one value of at least two or three values, the channel leakage ratio indicating a leakage of signal power from the first or second transmission band to the narrow band responsive to having determined a presence of an indicator signal in the narrow band.

Another embodiment may have a base station configured to operate a wireless communications network cell so as to provide a first transmission band and a second transmission band being separated by a narrow band; or wherein the narrow band is arranged adjacent to the first or second transmission band; wherein the base station is configured to receive an indicator signal in the narrow band and to transmit data to an apparatus that is operated to transmit a signal in the second transmission band, the data indicating that the apparatus is requested to reduce a channel leakage ratio indicating a signal power of the transmitted signal in the narrow band.

According to another embodiment, a wireless communications network may have: an inventive apparatus, being a first apparatus; and an inventive base station, being a first base station.

According to another embodiment, a method for operating an apparatus in a wireless communications network cell that is operated so as to provide a first transmission band and a second transmission band being separated by a narrow band, or wherein the narrow band is arranged adjacent to the first or second transmission band, may have the steps of: transmitting a data signal in the narrow band using a frequency band having frequencies of the narrow band; transmitting an indicator signal in the frequency band prior to transmitting the data signal so as to indicate the transmission of the data signal.

According to another embodiment, a method for operating an apparatus in a wireless communications network that is operated so as to provide a first transmission band and a second transmission band being separated by a narrow band, or wherein the narrow band is arranged adjacent to the first or second transmission band, may have the step of: reducing a channel leakage ratio to one value of at least two values, the channel leakage ratio indicating a leakage of signal power from the first or second transmission band to the narrow band responsive to having determined a presence of an indicator signal in the narrow band.

According to another embodiment, a method for operating a base station so as to operate a wireless communications network cell so as to provide a first transmission band and a second transmission band being separated by a narrow band, or wherein the narrow band is arranged adjacent to the first or second transmission band, may have the step of: receiving an indicator signal in the narrow band and transmitting data to an apparatus that is operated to transmit a signal in the second transmission band, the data indicating that the apparatus is requested to reduce a channel leakage ratio indicating a signal power of the transmitted signal in the narrow band.

According to another embodiment, a non-transitory computer program product may have a computer readable medium storing instructions which, when executed on a computer, carry out the inventive methods.

The inventors have found that a narrow-band frequency range may be used for ultra-reliable communication when announcing such a communication to other nodes such that the other nodes may reduce their usage of the narrow band and such that a sweeping or cleaning of the frequency band is obtained. This allows for a low interference in the narrow band and thus for a reliable communication.

According to an embodiment, an apparatus is configured to operate in a wireless communications network cell that is operated so as to provide a first transmission band and a second transmission band being separated by a narrow band. The apparatus is configured to transmit a data signal using a frequency band comprising a center frequency, wherein the center frequency is a frequency of the narrow band. The apparatus is configured to transmit an indicator signal in the frequency band prior to transmitting the data signal so as to indicate the transmission of the data signal. This allows for a notification of further network nodes or communicating devices so as to ensure that they avoid disturbing the announced communication in the narrow band. Thus, the embodiment may allow for using the narrow band for ultra-reliable communication and thus for an enhancement of the network resources provided as the ultra-reliable communication may be transmitted with existing networks.

According to an embodiment, the narrow band is one of a plurality of narrow bands separating a plurality of transmission bands in the wireless communications network cell. The apparatus is configured to transmit the indicator signal in the plurality of narrow bands. This may allow for a sweeping through the plurality of narrow bands and may allow for a transmission which narrow bands the apparatus wants to use or is able to use. This may allow a base-station or a further network node to allocate one or more of the indicated narrow bands to the apparatus.

According to an embodiment, the narrow band is one of a plurality of narrow bands in the widest communications network cell, the plurality of narrow bands separating a plurality of transmission bands. The apparatus is configured to select one of the plurality of narrow bands for transmission of the data signal and to transmit the indicator signal in the selected narrow band whilst not transmitting the indicator signal in a different narrow band of the plurality of narrow bands. This may allow for a selection by the apparatus which narrow band shall be used for ultra-reliable communication.

According to an embodiment, the apparatus is configured to code the indicator signal with a first modulation coding scheme comprising a first information bitrate and to code the data signal with a second modulation coding scheme comprising a second information bitrate. This may allow for using a situation-adequate modulation coding scheme such as a low-modulation coding scheme comprising a low information bitrate for the indicator signal that may face a high amount of interference in the narrow band and to use a higher modulation coding scheme comprising a higher information bitrate for the data signal that is expected to face a lower amount of interference. This may allow for an adaptation of the used information bitrate.

According to an embodiment, the apparatus is configured to transmit the indicator signal in a plurality of subframes or slots of a communication protocol of the wireless communications network cell. This may allow for a high chance of the indicator signal being detected by a receiving node.

According to an embodiment, the apparatus is configured to transmit the indicator signal responsive to a transmission query received from an application of the apparatus. The transmission query may indicate a requested transmission of data. The apparatus may be configured to deactivate the transmission in the narrow band after the transmission of the data signal. The embodiment may allow for reserving the narrow band for the ultra-reliable communication in situations that may use the ultra-reliable communication and to unblock the narrow band after the transmission for other purposes. This may allow for a further increase of resource efficiency.

According to an embodiments, an apparatus is configured to operate in a wireless communications network cell that is operated so as to provide a first transmission band and a secand transmission band being separated by a narrow band. The apparatus is configured to reduce a channel leakage ratio indicating a signal power of a transmitted signal in the narrow band responsive to having determined a presence of an indicator signal in the narrow band. The apparatus is configured to use as a new value of the channel leakage ratio one value of at least three values for reducing the channel leakage ratio. The at least three values may comprise a minimum value $ACLR_{min}$, a maximum value $ACLR_{max}$ and at least one intermediate value $ACLR_{mid}$ between the minimum value and the maximum value, i.e., $ACLR_{min} < ACLR_{mid} < ACLR_{max}$. The determining may be based on own observations and/or may be based on information received from a further node such as a base-station. The apparatus may thus be configured to avoid disturbing or interfering with the narrow band responsive to the indicator signal by reducing the channel leakage ratio. This may be understood as continuation of communication while avoiding interfering with the adjacent narrow band. This may allow for supporting the communication of other nodes. This embodiment may be implemented together with the embodiment according to which an apparatus transmits the indicator signal, i.e., an apparatus may transmit a first indicator signal and may reduce its channel leakage ratio responsive to a second indicator signal.

According to an embodiment, the apparatus may be configured to transmit a transmission signal in the second transmission band using a first channel leakage ratio indicating a signal power of the transmitted signal in the narrow band. Responsive to having determined the presence of the indicator signal in the narrow band, the apparatus is configured to continue transmitting in the second transmission band using a second channel leakage ratio having a lower but non-zero signal power in the narrow band than the first channel leakage ratio. This may allow for a situation dependent on increasing signal processing allowing for an increased data transmission in the whole frequency band and thus for a high response efficiency.

According to an embodiment, the apparatus is configured to reduce a roll-off factor for the transmission or is configured to insert zero-values into the transmitted signal to reduce the channel leakage ratio. Thus, the apparatus may be configured to change signal processing in the time-domain and/or in the frequency-domain so as to reduce the channel leakage ratio. According to an embodiment, the apparatus is configured to reduce the channel leakage ratio responsive to determining the presence of the indicator signal indicating a transmission of a data signal in the narrow band and to increase the channel leakage ratio after the transmission of the data signal. Thus, when the narrow band seems to be unused by the ultra-reliable communication, the apparatus may reduce its efforts for the signal processing which may allow for a fast signal processing and/or for a low-energy consumption.

According to an embodiment, the narrow band is a guard band or a wireless communications protocol such as Long-Term Evaluation (LTE) or 5G.

According to an embodiment, a base-station is configured to operate a wireless communications network cell so as to provide a first transmission band and a second transmission band being separated by a narrow band. The base-station is configured to receive an indicator signal in the narrow band and to transmit data to an apparatus that is operated to transmit a signal in the second transmission band. The data indicates that the apparatus is requested to reduce a channel leakage ratio indicating a signal power of the transmitted signal in the narrow band. This may allow for controlling other network nodes so as to reduce their channel leakage ratio responsive to reception of the indicator signal.

According to an embodiment, the indicator signal comprises information indicating a request for transmitting a first data signal in a first frequency range of the narrow band. The basestation is configured to assign the first frequency range to a first apparatus transmitting the indicator channel and to assign a second frequency range of the metal band to a second apparatus for transmission of a second data signal. The indication for using the first frequency range may be, for example, a simple presence of the indicator signal in the narrow band. Alternatively or in addition, the indicator signal may comprise a dedicated information that indicates a specific frequency range in the narrow band. Based thereon, the basestation may recognize that at least a part of the bandwidth of the narrow band is requested to be used for a later data signal and may decide to assign the first frequency range to the transmitter of the indicator signal. Further bandwidth of the narrow band may be assigned to other nodes, i.e., more than one data signal may be transmitted in the narrow band. This may allow for a further increase of resource efficiency.

According to an embodiment, a wireless communications network comprises an apparatus that is configured to transmit the indicator signal and an apparatus that is configured to reduce its channel leakage ratio based on the indicator signal.

According to an embodiment, a method for operating an apparatus in a wireless communications network cell that is operated so as to provide a first transmission band and a second transmission band being separated by a narrow band comprises transmitting a data signal using a frequency band comprising a center frequency, wherein the center frequency is a frequency of the narrow band. The method further comprises transmitting an indicator signal in the frequency band prior to transmitting the data signal so as to indicate the transmission of the data signal.

According to an embodiment, a method for operating an apparatus in a wireless communications network cell that is operated so as to provide a first transmission band and a second transmission band being separated by a narrow band comprises reducing a channel leakage ratio indicating a signal power of a transmitted signal in the narrow band responsive to having to determine a presence of an indicator signal in the narrow band.

According to an embodiment, a method for operating a base-station so as to operate a wireless communications network cell so as to provide a first transmission band and a second transmission band being separated by a narrow band, comprises receiving an indicator signal in the narrow band and transmitting data to an apparatus that is operated to transmit a signal in the second transmission band. The data indicates that the apparatus is requested to reduce a channel leakage ratio indicating a signal power of the transmitted signal in the narrow band.

According to an embodiment, a non-transitory computer program product comprises a computer-readable medium storing instructions which, when executed on a computer carry out a method for operating an apparatus and/or a method for operating a base-station according to embodiments described herein.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
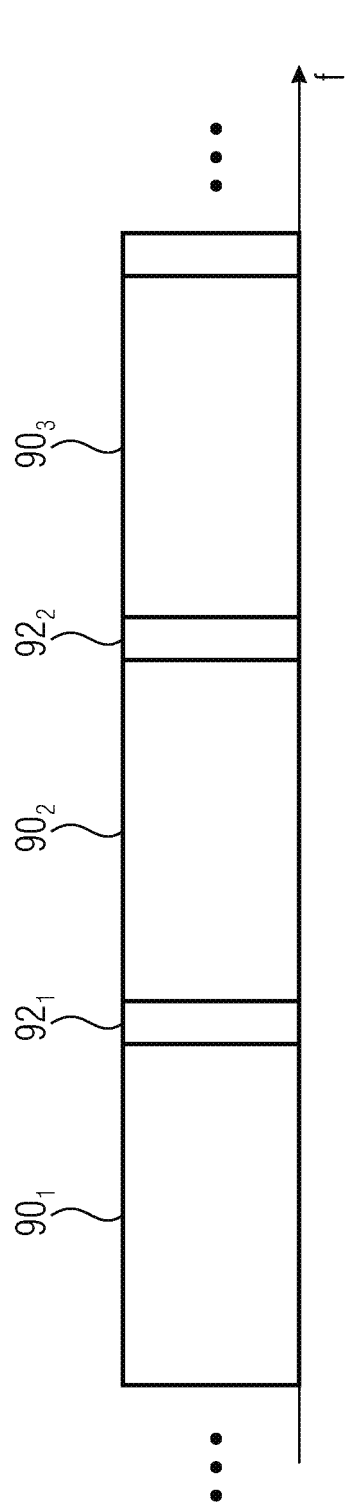
FIG. 1 is a schematic representation of three transmission bands being displayed at a frequency-axis and separated by narrow bands, according to an embodiment.

Equal or equivalent elements or elements with equal or equivalent functionality are denoted in the following description by equal or equivalent reference numerals even if occurring in different figures.

Descriptions provided herein relating to an apparatus may relate to various kinds of apparatus such as a user equipment and/or a base station but may also relate to other equipment such as Internet-of-Things devices (IoT). A use of indicator signals described herein may relate to an uplink scenario in which an apparatus transmits data to another apparatus. This description does relate to a downlink scenario without any limitation. In such a scenario an apparatus may transmit data to the receiving apparatus which is complementary to the up-link scenario.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described herein relate to wireless communications and to the field of using resources in a wireless communications network. Although some embodiments described herein are explained in light of the long-term evolution (LTE) standard, the teachings disclosed herein may be used without any limitation in other fields of wireless communications such as 5G or the like.

Embodiments described herein relate to data transmission in so-called transmission bands, i.e., frequency bands that were originally designed for data transmission. Furthermore, embodiments described herein relate to so-called narrow bands that may be arranged between two transmission bands. A bandwidth of a narrow band in accordance with examples is at most 50%, at most 40% or at most 20% of a bandwidth of a transmission band that is regularly used or determined to be used for a data transmission. For example, a narrow band may be a so-called guard band that may be used for decaying a signal power of the transmission bands so as to reduce or eliminate interference in adjacent transmission bands. This is explained in connection with FIG. 1 showing three transmission bands $90_1$, $90_2$ and $90_3$ being displayed at a frequency-axis. Between two adjacent transmission bands $90_1$ and $90_2$, $90_2$ and $90_3$ narrow bands $92_1$ and $92_2$ are arranged which may serve as guard band each. Although referring to, hereinafter, guard bands, the teachings disclosed herein may alternatively relate to any other adjacent frequency band that is used or occupied by a network node or transmitter transmitting in a transmission band $90_1$, $90_2$ or $90_3$. A transmission band may be any frequency range that provides for bandwidth to be used for a data transmission in the wireless communications network.

Figure 2:
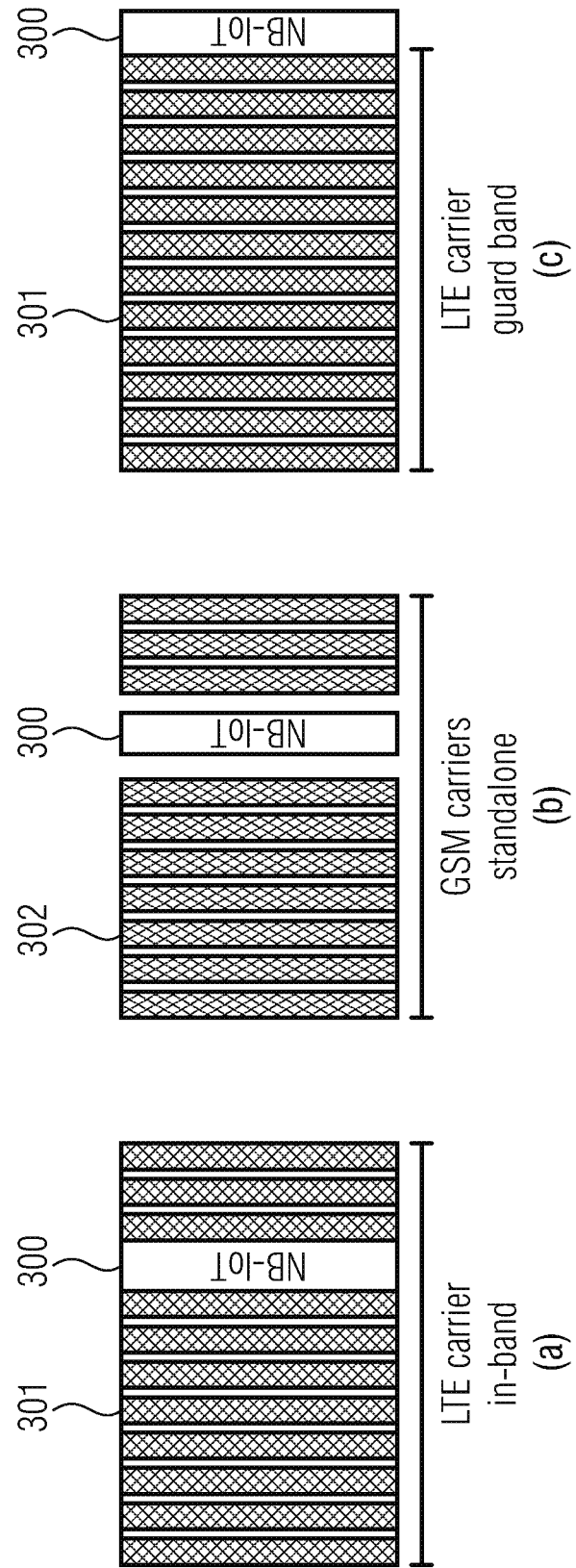
FIG. 2 is a schematic representation of the different operating modes in accordance with NB-IoT, also referred to as the NB-IoT.

Three operating modes for NB-IoT are now described with reference to FIG. 2, namely the in-band LTE operation mode, the standalone GSM operation mode, and the LTE guard band operation mode. FIG. 2 is a schematic representation of the different operating modes in accordance with NB-IoT, also referred to as the NB-IoT. FIG. 2(a) shows the in-band LTE operation mode in accordance with which a NB-IoT carrier or frequency band 300, also referred to as a NB-IoT channel, is deployed within the LTE carrier or frequency band 301. FIG. 2(b) shows the standalone GSM operation mode placing the NB-IoT frequency band 300 among a plurality of GSM carriers 302. The NB-IoT frequency band 300 is separated by a guard band from the GSM carriers. FIG. 2(c) shows the LTE guard band operation mode, in accordance with which the NB-IoT carrier 300 is placed in one of the LTE guard bands provided at both ends of the carrier of the standard LTE.

Such NB-IoT frequency bands 300 may be considered as a narrow band. For example, a GSM carrier may comprise a frequency width of 200 kHz. An LTE carrier may comprise a band frequency with being, for example, 180 kHz. Thus, such an NB-IoT band may be transmitted in a GSM carrier.

Figure 3:
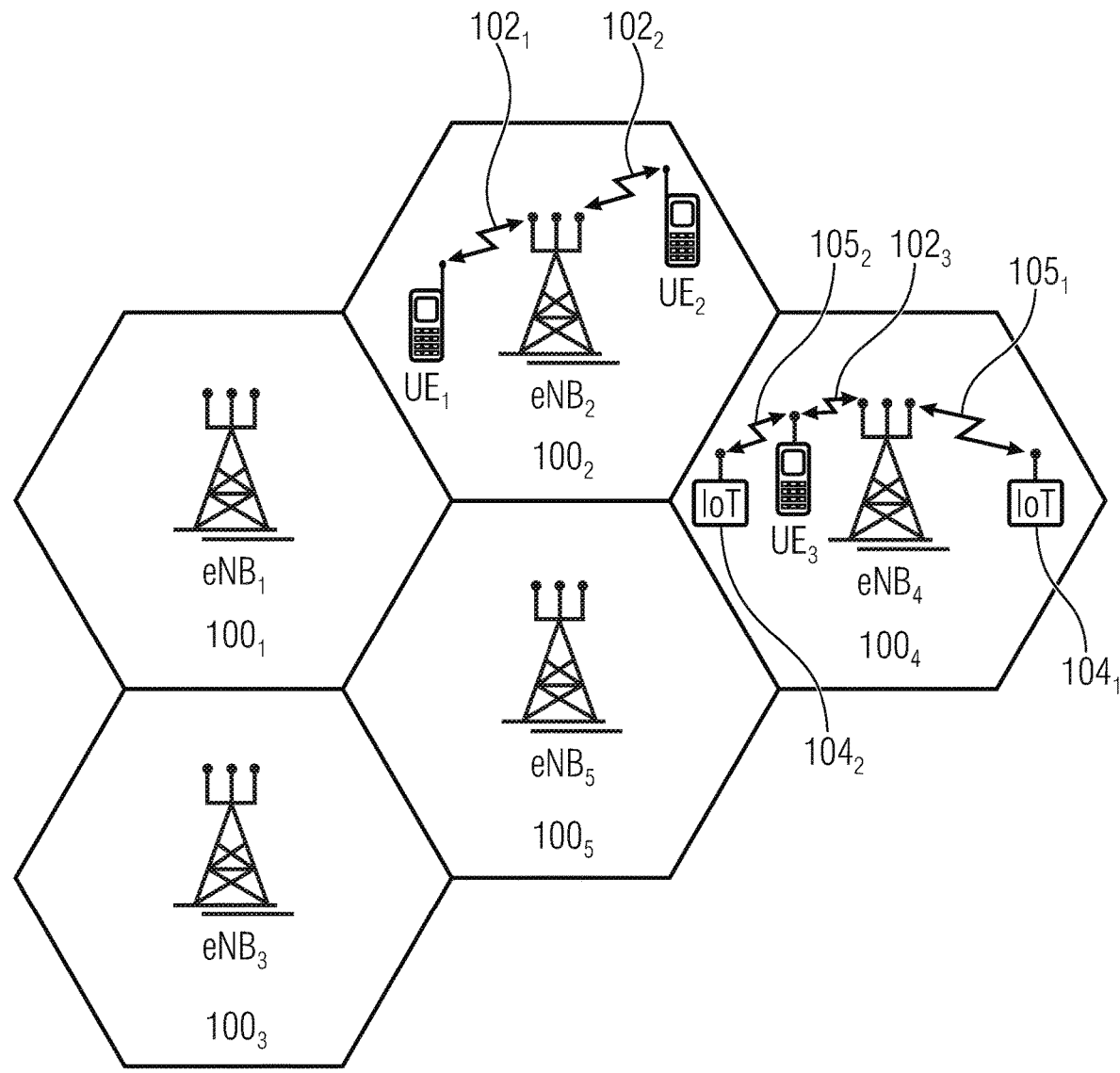
FIG. 3 is a schematic representation of an example of a network infrastructure according to an embodiment.

IoT devices may include physical devices, vehicles, buildings and other items having embedded therein electronics, software, sensors, actuators, or the like as well as network connectivity that enable these devices to collect and exchange data across an existing network infrastructure. FIG. 3 is a schematic representation of an example of such a network infrastructure, like a wireless communication system including a plurality of base stations $eNB_1$ to $eNB_5$, each serving a specific area surrounding the base station schematically represented by the respective cells $100_1$ to $100_5$. The base stations are provided to serve users within a cell. A user may be a stationary device or a mobile device. Further, the wireless communication system may be accessed by IoT devices which connect to a base station or to a user. FIG. 3 shows an exemplary view of only five cells, however, the wireless communication system may include more such cells. FIG. 3 shows two users $UE_1$ and $UE_2$, also referred to as user equipment (UE), that are in cell $100_2$ and that are served by base station $eNB_2$. Another user $UE_3$ is shown in cell $100_4$ which is served by base station $eNB_4$. The arrows $102_1$, $102_2$ and $102_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 3 shows two IoT devices $104_1$ and $104_2$ in cell $100_4$, which may be stationary or mobile devices. The IoT device $104_1$ accesses the wireless communication system via the base station $eNB_4$ to receive and transmit data as schematically represented by arrow $105_1$. The IoT device $104_2$ accesses the wireless communication system via the user $UE_3$ as is schematically represented by arrow $105_2$.

The wireless communication system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-s-OFDM or SC-FDMA. Other waveforms, like non-orthogonal waveforms for multiple access, e.g. filter-bank multicarrier (FBMC), may be used. Standard LTE devices, like the users $UE_1$, $UE_2$, $UE_3$, operate within a first bandwidth, and the IoT devices $104_1$ and $104_2$ operate within a second bandwidth which is narrower than the first bandwidth. The second bandwidth may be defined in accordance with the NB-IoT enhancement of the LTE Rel. 13 standard, referred to in the following also as NB-IoT. A wireless communication system operating in accordance with the LTE standard may have a system bandwidth of 1.4 MHz, 3.0 MHz, 5 MHz, 10 MHz, 15 MHz, 20 MHz or aggregated system bandwidth consisting of any combination of these, and the bandwidth in accordance with the NB-IoT enhancement of the LTE Rel. 13 standard may be by 200 kHz.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix (CP) length.

Figure 4:
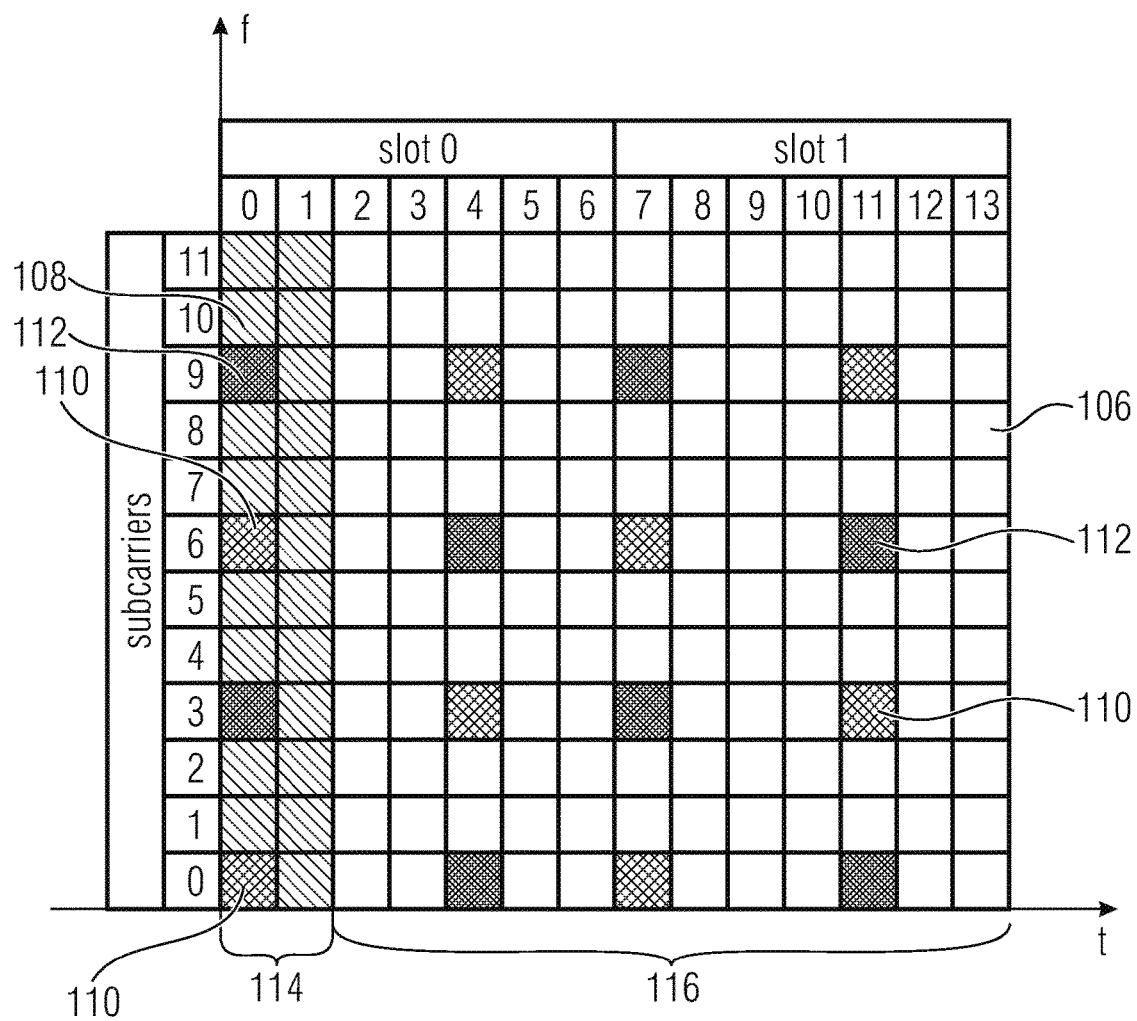
FIG. 4 is an exemplary representation of an LTE OFDMA-based subframe with two antenna ports for different selected Tx antenna ports, according to an embodiment.

FIG. 4 shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 106 represent resource elements allocated to the PDSCH including the payload or user data, also referred to a payload region. The resource elements for the physical control channels (including non-payload or non-user data), also referred to the control region, are represented by the hatched boxes 108. In accordance with examples, resource elements 108 may be allocated to the PDCCH, to the physical control format indicator channel (PCFICH), and to the physical hybrid ARQ indicator channel (PHICH). The cross-hatched boxes 110 represent resource elements which are allocated to the RS that may be used for the channel estimation. The black boxes 112 represent unused resources in the current antenna port that may correspond to RSs in another antenna port. The resource elements 108, 110, 112 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 4 may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1 the resource elements associated with symbols 8, 9, 10, 12 and 13 are all allocated to payload data, while for symbols 7 and 11 less resource elements are allocated to payload data. Although relating to OFDMA-based subframes, embodiments may also be implemented in other schemes such as Single Carrier Frequency Division Multiple Access (SC-FDMA).

Figure 5A:
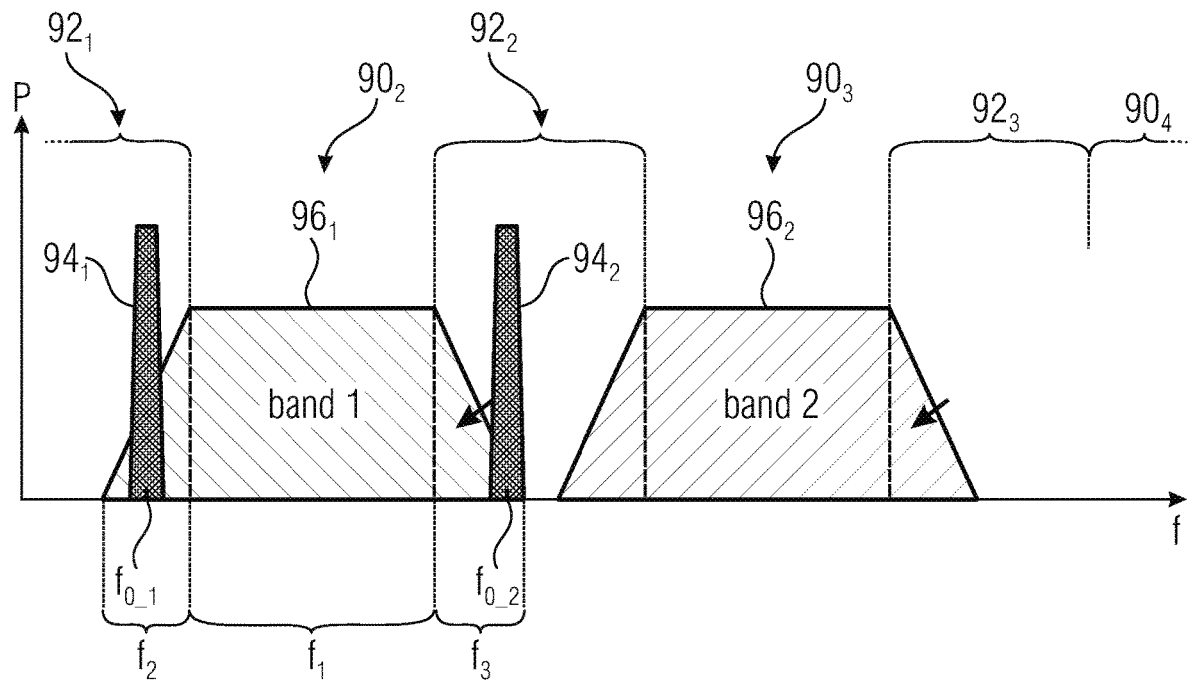
FIG. 5a is a schematic representation of an arrangement of frequency bands in the frequency range and a transmission power that may be present in the frequency bands, according to an embodiment.

FIG. 5a shows a schematic diagram of an arrangement of frequency bands in the frequency range and a transmission power P that may be present in the frequency bands for illustrating operation of an apparatus in a wireless communications network or a cell thereof. Such a wireless communications network cell may be one of the cells $100_1$ to $100_5$. The transmission bands $90_2$ and $90_3$ may be operated by a single base station such as one of $eNB_1$ to $eNB_5$ and thus belong to a common cell or may be operated by different base stations and thus belong to different cells.

An apparatus that aims to transmit a data signal in one of the narrow band $92_1$, $92_2$ and $92_3$ is configured to transmit an indicator signal in the respective narrow band $92_1$, $92_2$ or $92_3$. This may be one of the base stations $eNB_1$ to $eNB_5$, a user equipment $UE_1$ or $UE_2$ or an IoT device $104_2$ or $104_2$. I.e., the apparatus may configured to transmit the indicator signal in a plurality of subframes or slots of a communication protocol of the wireless communications network cell. For transmitting the indicator signal and/or for transmitting the data signal in the narrow band $92_1$, $92_2$ or $92_3$, the device may use a frequency range comprising a center frequency such as $f_{0\_1}$ or $f_{0\_2}$. The respective center frequency $f_{0\_1}$ or $f_{0\_2}$ may be within the frequency range of the respective narrow band $92_1$, $92_2$ or $92_3$. The indicator signal may thus be transmitted in slots aside the configuration according to FIG. 4.

In the transmission band $92_2$ and/or $92_3$ a further network node such as a base-station, a user equipment or an IoT device may be configured to transmit signals or messages. The transmission bands $90_2$ and/or $90_3$ may be designed such that the data transmission itself is performed in a frequency band $f_1$ of the transmission band $90_2$. At the edges or borders of the frequency band $f_1$ a so-called Adjacent Channel Leakage Ratio (ACLR) decaying may occur such that frequency bands $f_2$ and $f_3$ are also occupied by the signal transmitted in the frequency range $f_1$, i.e., in the transmission band $90_2$. Guard bands may be used to allow for such a decaying. Alternatively, guard bands may be occupied for data transmission, i.e., they may be used as additional bandwidth enlarging the bandwidth of the transmission band, $90_2$ or $90_3$.

I.e., the narrow band $92_1$ may be a first narrow band and a second narrow band $92_3$ may be arranged between the second transmission band $90_3$ and a third transmission band $90_4$ in the frequency range. The apparatus may be configured to reduce the channel leakage ratio in the first $92_2$ and in the second narrow band $92_3$ responsive to having determined the presence of the indicator signal $94_2$ in the first narrow band $92_2$. Alternatively or in addition the apparatus may be configured to reduce the channel leakage ratio in the first narrow band $92_2$ responsive to having determined the presence of the indicator signal $94_2$ in the first narrow band while leaving the channel leakage ratio unchanged in the second narrow band $94_3$.

The apparatus may be configured to increase the channel leakage ratio after the transmission of the data signal $98_1$.

Determining the presence of the indicator signal $94_1$ may comprises a reception of the indicator signal $94_1$ and/or may comprise reception of data that indicates the reception of the indicator signal $94_1$ by a further apparatus.

An apparatus according to embodiments is configured to transmit an indicator signal $94_1$ and/or $94_2$ in the guard bands $92_1$, $92_2$ respectively, prior to transmitting a data signal in the transmission band $90_2$. By transmitting the indicator signal $94_1$ and/or $94_2$ a following or subsequent transmission of the data signal may be indicated. This allows a notification of other nodes about the forthcoming transmission of the data signal. Thus, the indicator signals $94_1$ and/or $94_2$ may be considered as signals implemented to sweep or clean the guard band from other users. The later transmitted data signal may comprise information that is a subject to an ultra-reliable communication, i.e., the transmission of the data signal may face high requirements. By announcing the data signal, other nodes are able to reduce their disturbances in the guard bands, for example, by reducing their ACLR.

Figure 5B:
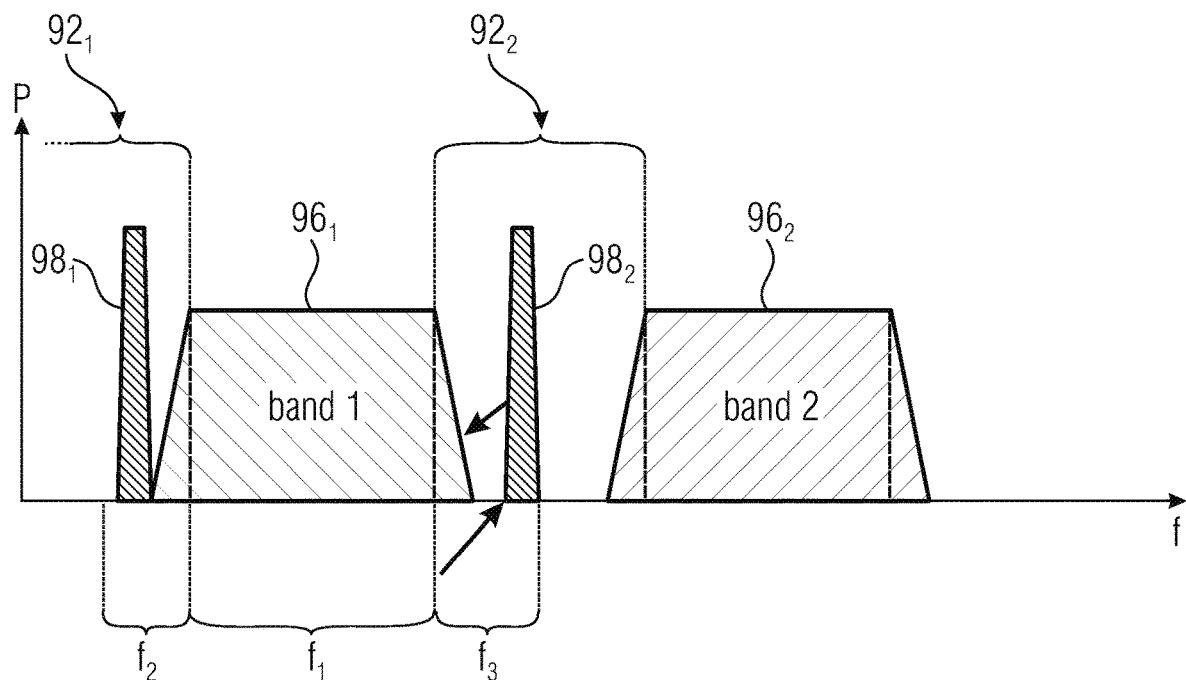
FIG. 5b is a schematic representation of the signal power over the frequency range that is obtained responsive to transmission of an indicator signal, according to an embodiment.

FIG. 5b shows a schematic diagram of the signal power over the frequency range f that is obtained responsive to transmission of the indicator signal $94_1$ and/or $94_2$.

Apparatus such as user equipment, base-stations and/or narrow-band IoT devices have reduced their signal power in the guard bands, e.g., by reducing the channel leakage ratio. The channel leakage ratio may indicate a signal power P of a transmitted signal in the guard bands $92_1$ and $92_2$ and thus a leakage of power from the transmission band to the guard band. The apparatus may have determined the presence of the indicator signal $94_1$ and/or $94_2$ by monitoring the frequency bands, for example, when receiving messages in these frequency bands. Alternatively or in addition, the apparatus may obtain information from a different node such as a base-station that has received the indicator signal or a message related hereto.

Responsive to having determined the presence of the indicator signal $94_1$ and/or $94_2$ the apparatus may reduce their signal power in the frequency bands $f_2$ and/or $f_3$ so as to transmit a lower amount of signal power in the guard bands $92_1$ and/or $92_2$ when compared to the scenario of FIG. 5a. For reducing the signal power in the guard band, the apparatus is configured to use one value of at least three values comprising the minimum value, the maximum value and at least one intermediate value. For example, a base station may transmit data to the apparatus that is operated to transmit a signal $96_2$ in the second transmission band $90_2$. The data may indicate that the operated apparatus is requested to reduce a channel leakage ratio indicating the signal power P of the transmitted signal $96_2$ in the narrow band $92_2$. The reduced channel leakage ratio may be understood as at least a lower signal power transmitted by the node in the guard band, wherein the apparatus is configured to use or select at least one level between a minimum channel leakage ratio and a maximum channel leakage ratio, i.e., to use or select one of a multitude of levels. For selecting the level, the apparatus may use a lookup-table, may determine the values on its own or may receive the values. This may include but does not require a transmission of no signal power in the guard band. The channel leakage ratio may be reduced in the time-domain and/or in the frequency-domain. For example, a pulse shaping in the time-domain (convolving with a roll-offed filter coefficients) may reduce the ACLR in the frequency domain. In the time-domain, for example, the apparatus is configured to use a lower roll-off factor that allows for a faster signal decay over the frequency range. In the frequency-domain, for example, the apparatus is configured to insert zero-values (allocate null subcarriers) into the signal so as to reduce the signal power in the guard band and/or may be configured to reduce a frequency range used for data transmission.

The apparatus that transmitted the indicator signals $94_1$ and/or $94_2$ may later or subsequently transmit a data signal $98_1$ in the guard band $92_1$ and/or a data signal $98_2$ in the guard band 922. Such a communication may face a low interference and may therefore be considered as an ultra-reliable and low-latency communication as the low interference may also prevent from re-transmission and therefore save time. Thus, a reduced ACLR decay may be implemented for an NB-URLLC (NB-IoT devices with URLLC requirements) transmission in the guard bands. A timing of the transmission of the respective data signal $98_1$ or $98_2$ with respect to the transmission of the indicator signal $94_1$ or $94_2$ may be in accordance with a communication standard used in the wireless communications network. For example, a time for which a guard band has to be kept at low interference after having determined a usage thereof may be known for the nodes or may be indicated by the base station. Thus, the apparatus that has transmitted an indicator signal $94_1$ and/or $94_2$ may know a time interval during which the cleaning-effect of the indicator signal is effective.

The guard bands $92_1$ and $92_2$ may be two of a plurality of narrow bands or guard bands in the wireless communications network cell. An apparatus that transmits indicator signals such as the indicator signal $94_1$ or $94_2$ may transmit in two, three, four or more guard bands, subsequently or in parallel and may transmit an indicator signal at diverse frequencies. Alternatively or in addition, such an apparatus may be configured to select one or more of the available guard bands and may transmit an indicator signal 92 in a selected guard band. Furthermore, the apparatus may transmit the indicator signal in a selected guard band or in a plurality of guard bands and may await information which guard band is selected by an organizing node such as a base-station for the transmission of the data signal. Such information may be transmitted by a separate signal and may be evaluated by the apparatus that has transmitted the indicator signal. The apparatus may then use the guard band selected by the organizing node.

Although FIG. 5b may be understood as an apparatus reducing its transmission power of the transmission signal $96_1$ in both adjacent guard bands $92_1$ and $92_2$, the apparatus may be configured to handle both adjacent guard bands $92_1$ and $92_2$ differently. For example, the apparatus may reduce the channel leakage ratio in one guard band $98_1$ or $98_2$ and may not reduce or to a lower extent the channel leakage ratio in the other guard band $92_2$ or $92_1$. For example, the apparatus only reduces the channel leakage ratio for guard bands that are requested to be used for ultra-reliable communication, e.g., for which guard bands indicated signals have been transmitted. Thus, the apparatus may be configured to reduce the channel leakage ratio in both adjacent guard bands responsive to having determined the presence of the indicator signal in the narrow band and/or may be configured to reduce the channel leakage ratio in the narrow band responsive to having determined the presence of the indicator signal in the narrow band while leaving the channel leakage ratio unchanged in a different narrow band.

Figure 6:
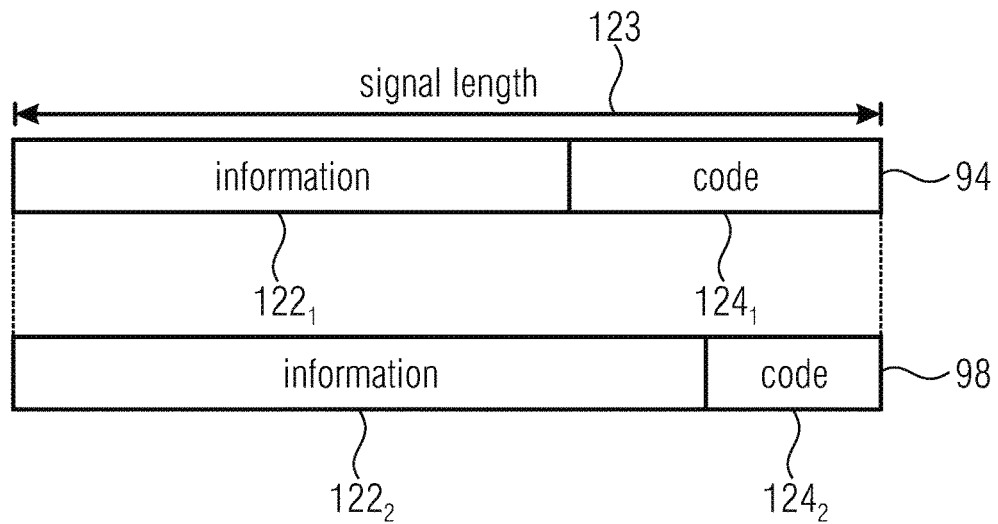
FIG. 6 is a schematic illustration of a comparison of an indicator signal and a data signal according to an embodiment.

FIG. 6 shows a schematic illustration of a comparison of the indicator signal 94 and the data signal 98. The indicator signal 94 may contain information such as control data that is transmitted to a receiving node such as a base-station. The apparatus, for example, $UE_1$ may be configured to code the indicator signal 94 with a first modulation coding scheme. The first modulation coding scheme may comprise a first information bitrate that may be understood as an amount of information $122_1$ contained in the message comprising a signal length 123. In addition to information $122_1$, the indicator signal 94 may comprise further components such as channel coding parity bits and/or code $124_1$ that may add redundancy or the like allowing for correction of bit errors at a receiver of the indicator signal 94. The data signal 98 may comprise a higher amount of information $122_2$ and/or a higher bitrate when compared to the indicator signal 94 at a same signal length 123 of the data signal 98 and the indicator signal 94. I.e., the second information bitrate may be higher than the first information bitrate. For example, a higher modulation coding scheme may be used for the data signal 98 when compared to the indicator signal 94. The indicator signal may serve as an announcement of a following data signal such as the data signal 98 and may, in addition comprise information to be evaluated at a receiver. The data signal may be expected to face a low amount of interference and may thus be coded with a higher coding scheme allowing for an increase of transmission of information. The information contained in the indicator signal is, for example, an emergency message or the like indicating an emergency state of an apparatus or a public scenario that should be reported immediately. Alternatively or in addition, the information may indicate an amount of frequency width or bandwidth that is requested to be used for the data signal and/or may indicate a level of useful Quality of Service (QoS) of the forthcoming data signal.

Although the indicator signal 94 and the data signal 98 are illustrated as comprising the same length 123, the signals may comprise a length that differs from each other. When having different lengths, the information bitrate that may be described as an amount of information related to the total signal length may be the same or different, independent of a chosen signal length. Between transmission of the indicator signal 94 and the data signal 98 a time interval may be arranged, i.e., the apparatus may wait for the other nodes to reduce their ACLR. The time interval may comprise a length of, for example, 1 to 5 ms. Alternatively, the apparatus may change the coding scheme after reception of an acknowledging message (ACK), for example, from a base station, that indicates a reduced ACLR. Alternatively or in addition, the apparatus such as an IoT device may senses the interference on the transmitting frequency and may change the coding scheme based on the sensed values, e.g., increase the coding scheme when low interference is sensed.

A network node or apparatus that involves ultra-reliable and/or low-latency communication may receive or obtain information indicating the requirement for data transmission, for example, from an application of the apparatus. The application may involve data transmission and may thus indicate the communication that may be used. For example, a time interval is going to end or a data buffer is almost full and there is a risk of data loss. The apparatus may be configured to transmit the indicator signal responsive to such an event and may cause other apparatuses to prevent guard bands from being disturbed by transmitting the indicator signal. After having performed the data exchange that may be used, one or both, the indicating apparatus and/or the apparatus or apparatuses reducing their disturbances may return to normal operation. Thus, the apparatus may be configured to deactivate in an uplink mode and/or mute in a downlink mode, the transmission in the narrow band (guard band) after the transmission of the data signal $98_1$ and/or $98_2$, wherein an apparatus that reduces its channel leakage ratio may be configured to increase its channel leakage ratio after the transmission of the data signal $98_1$ and/or $98_2$. Thus, the filter coefficients or settings may be relaxed again so as to allow for a reduced computational effort and/or a high data rate. Such a return may be performed by an apparatus that reduces its ACLR, after a timer has run out and/or after the data signal was transmitted.

The network may have knowledge about the transmission of the data signal. For example, it may be known in the network that in a specific frame, subframe or slot after the transmission of the indicator signal, the data signal is transmitted. Alternatively or in addition, it may be known that the indicator signal is valid for a special amount of time and/or resource blocks that have to be prevented from disturbances and that the disturbances may be continued after the reserved slots. Alternatively or in addition, a base-station may switch on and off the decreased channel leakage ratio by informing the respective nodes about the requirements.

An apparatus that is requested to reduce its channel leakage ratio may be configured to receive information from a further node such as a base-station, the information indicating at least a resource element of the wireless communications network cell. The apparatus may be configured to reduce the channel leakage ratio for the indicated resource element based on the information. The apparatus is configured to use one value of at least three values comprising the minimum value, the maximum value and at least one intermediate value of the channel leakage ratio. The three values may comprise at least the original ACLR value plus one or more ACLR values that may be lower and/or higher when compared to the original ACLR value. The apparatus that reduces its channel leakage ratio may be an IoT device, a user equipment or a base-station. Especially base-stations may be configured to extract the control information from the indicator signal $94_1$ and/or $94_2$ when it is contained in the indicator signal.

Figure 7A:
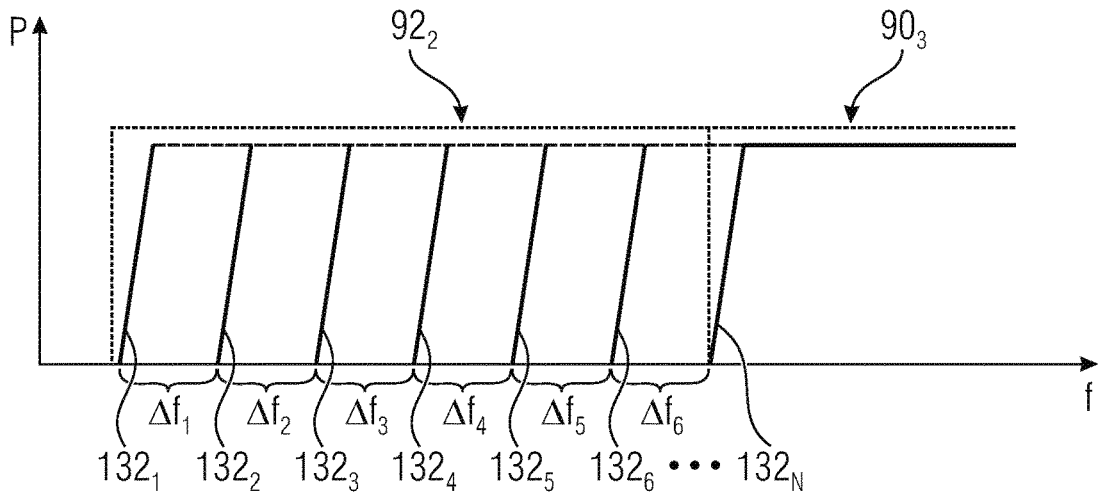
FIG. 7a is a schematic diagram of a multitude of schematic filter characteristics that allow for an adaptive ACLR according to an embodiment.
Figure 7B:
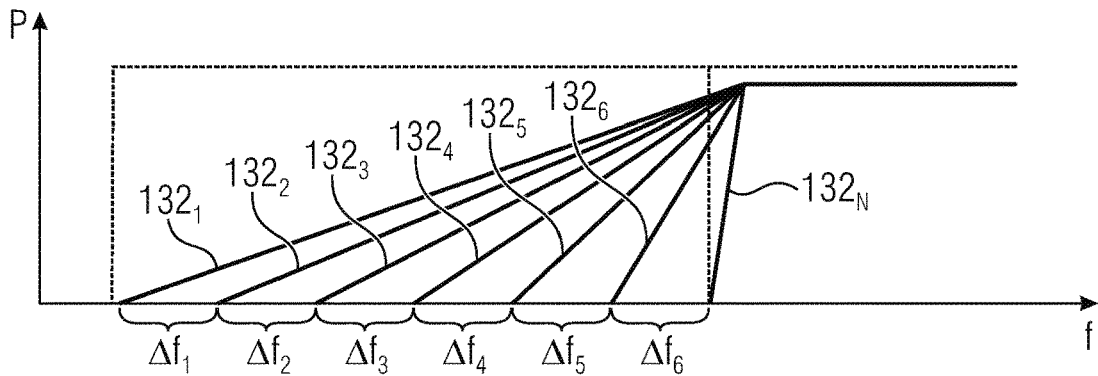
FIG. 7b is a schematic diagram of the multitude of schematic filter characteristics that allow for an adaptive ACLR by adjusting edges of the used frequency width according to an embodiment.

FIG. 7a shows a schematic diagram of a multitude of schematic filter characteristics 132 that allow for an adaptive ACLR by adjusting a used frequency width for data transmission, wherein by non-limiting example, a leakage of signal power P from the transmission band $90_3$ to the guard band $92_2$ is illustrated. FIG. 7b shows a schematic diagram of the multitude of schematic filter characteristics 132 that allow for an adaptive ACLR by adjusting edges of the used frequency width. Both filter characteristics vary in an amount of signal power P that is transmitted in the guard band $92_2$, wherein according to FIG. 7a an increase in bitrate may be obtained by the additional signal power and wherein according to FIG. 7b a decrease in computational effort for filtering the signal may be obtained with a decrease in steepness of the edges. Both principles may be combined with each other. Such that explanations given hereinafter to one effect of the filter characteristics 132 also apply to the other as according to both effects a frequency band of the guard band $92_2$ is occupied by a signal of the transmission band $90_3$. Alternatively the signal may only be present in the guard band $92_2$.

The apparatus that is configured to adaptively reduce its ACLR may be configured to use one of a multitude of filter characteristics $132_1, 132_2, \ldots, 132_N$, wherein at least one filter characteristic is available between a first characteristic $132_1$ that allows for a maximum ACLR and a second characteristic $132_N$ that allows for a minimum ACLR. According to embodiments, a higher number of filter characteristics may be arranged between the first and second characteristic $132_1$ and $132_N$, for example at least 2, at least 3 or at least 10. Thus, it is possible to control the adaptive ACLR more detailed and not only in an on/off-manner. For example, the apparatus may reduce from a first level such as $132_1$ to $132_5$ to a lower but still non-zero value such as $132_6$. The first level and the second level may have different band reduction values. As previously mentioned, the adaption of the filter characteristics 132 may comprise an adaption or reduction of a roll-off factor and/or an insertion of ZERO-values into transmitted signals. I.e., the apparatus may be configured to reduce a roll-off factor for the transmission and/or to insert ZERO-Values into the transmitted signal $96_1$ to reduce the channel leakage ratio A minimum ACLR as indicated by the characteristic $132_N$ may be adapted to allow for a low or even none transmission power of a signal transmitted in the transmission band $90_3$ to the adjacent guard band $92_2$, but may involve a comparatively high computational effort and/or may transmit a comparatively low amount of data. With increasing ACLR, the apparatus may be configured to use an increasing amount of frequency width or bandwidth of the guard band $92_2$ for data transmission (FIG. 7a) and/or signal decay (FIG. 7b) whilst reducing the computational effort and/or increasing an amount of transmitted data. With a reduction of the ACLR an increase of frequency portions $\Delta f_1$ to $\Delta f_N$ may be considered to be cleaned or free from disturbances and thus suitable for URLLC. The multi-step reduction of the channel leakage ratio may be used, among other things, to clear such an amount that is used by one or more data signals later on.

For example, in each frequency portion $\Delta f_1$ to $\Delta f_N$ at least one data signal may be transmitted, wherein the eNB may allocate the respective resource elements.

Values of the filter coefficients or at least information that allows derivation thereof may be stored in a memory of the apparatus or may be received by a further node. The apparatus may be configured to vacate or clear the guard band $92_2$ according to actual requirements that may be indicated by the indicator signal. For example, the indicator signal may request to use only parts of the guard band $92_2$ such as the frequency portion $\Delta f_1$ and/or $\Delta f_2$ of the guard band $92_2$. The apparatus may use or implement a filter characteristic that satisfies this requirement, for example, when using the filter characteristic $132_3$ or an index higher than 3. Although the apparatus may use an index higher than 3, it may be configured to use a filter characteristic that uses a high or even highest amount of the guard band that is not required by other nodes so as to keep the amount of transmitted data high and/or the computational effort low and thus battery lifetime high.

Figure 8A:
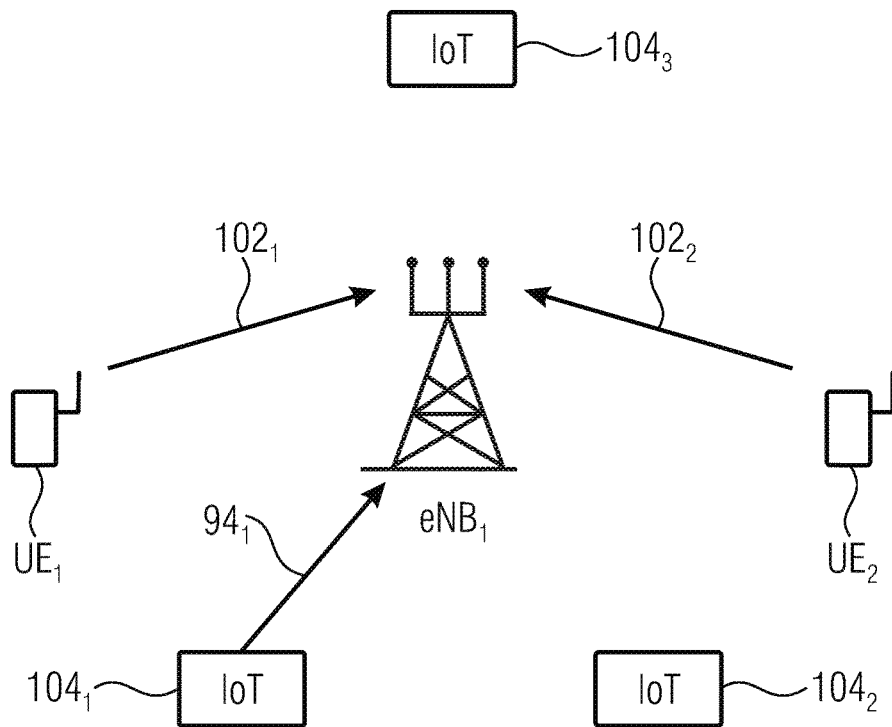
FIG. 8a is a schematic diagram of a wireless communication network cell in an uplink scenario, according to an embodiment.

FIG. 8a shows a schematic diagram of a wireless communication network cell 100 that may be one of cells $100_1$ to $100_5$ in an uplink scenario. $UE_1$ and/or $UE_2$ transmit, to the base-station $eNB_1$, data via the uplink/downlink connections indicated by the unidirectional arrows $102_1$ and $102_2$. The connections between $UE_1$ and the $eNB_1$ and between $UE_2$ and $eNB_1$ may be arranged in a same transmission band or in different transmission bands. During the uplink scenario, the IoT device $104_1$ transmits the indicator signal $94_1$ to the $eNB_1$.

A base-station such as one of $eNB_1$ to $eNB_5$ may be configured to receive the indicator signal $94_1$ in one or more of the guard bands. The base-station may be configured to transmit data to $UE_1$ and/or $UE_2$ indicating that the apparatus is requested to reduce a channel leakage ratio in one or more guard bands and in its uplink to the base station adjacent to the currently used transmission band. Further devices such as the IoT devices $104_2$ and/or $104_3$ may also transmit indicator signals requesting for a same or different frequency portions of the guard band. Such requests may also be transmitted by the $eNB_1$. The information transmitted by the $eNB_1$ to the $UE_1$ and/or $UE_2$ may be optionally acknowledged by the receiving node. Such an acknowledge may be received by the IoT $104_1$ such that it obtains information that there is most a high probability that the requested frequency portion is usable for URLLC. Alternatively or in addition the $eNB_1$ adapt its own filters.

Figure 8B:
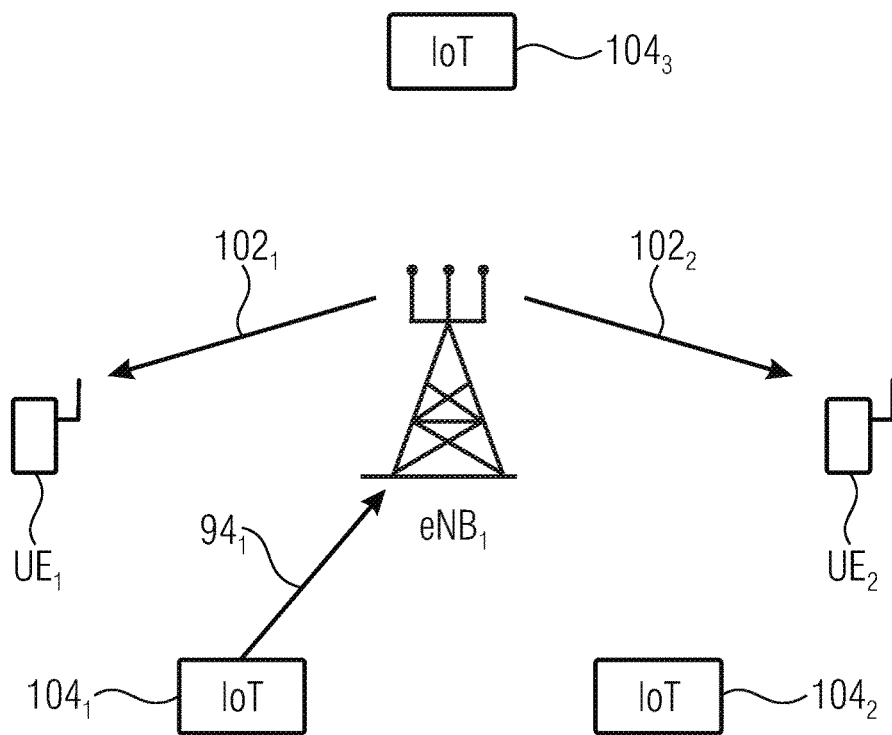
FIG. 8b is a schematic diagram of the wireless communications cell in a downlink scenario according to an embodiment.

FIG. 8b shows a corresponding downlink scenario of the cell 100 in which the $eNB_1$ transmits to the $UE_1$ and/or $UE_2$. The $eNB_1$ may monitor the guard band even when transmitting and may evaluate the indicator signal $94_1$ for its presence and/or for information contained therein. The $eNB_1$ may adapt its own transmission filters so as to reduce its ACLR according to the request in the indicator signal $94_1$. Alternatively or in addition the $eNB_1$ may instruct the $UE_1$ and/or $UE_2$ so as to adapt their filters.

A bandwidth or frequency width that is used for transmission of a data signal 98 may be smaller when compared to a bandwidth or frequency width of a used guard band $92_1$ and/or $92_2$. This may allow for a base-station that is configured to assign a portion of the frequency width or bandwidth of the guard band to a requesting node that transmitted the indicator signal and a different portion to a different node that has, for example, transmitted a different indicator signal. Thus, the available resources may be used by more than one node. Thus, the indicator signal may comprise information indicating a request for transmitting a first data signal in a first frequency.

The filter coefficients 132 or information related hereto may be stored in the UE and/or the eNB that implements a characteristic of multiple levels of characteristics, for example, using a lookup-table such that reception of an index of the lookup table may be a sufficient information to indicate the requirements. Such a table may be received from the eNB, e.g., during an association process.

Figure 8C:
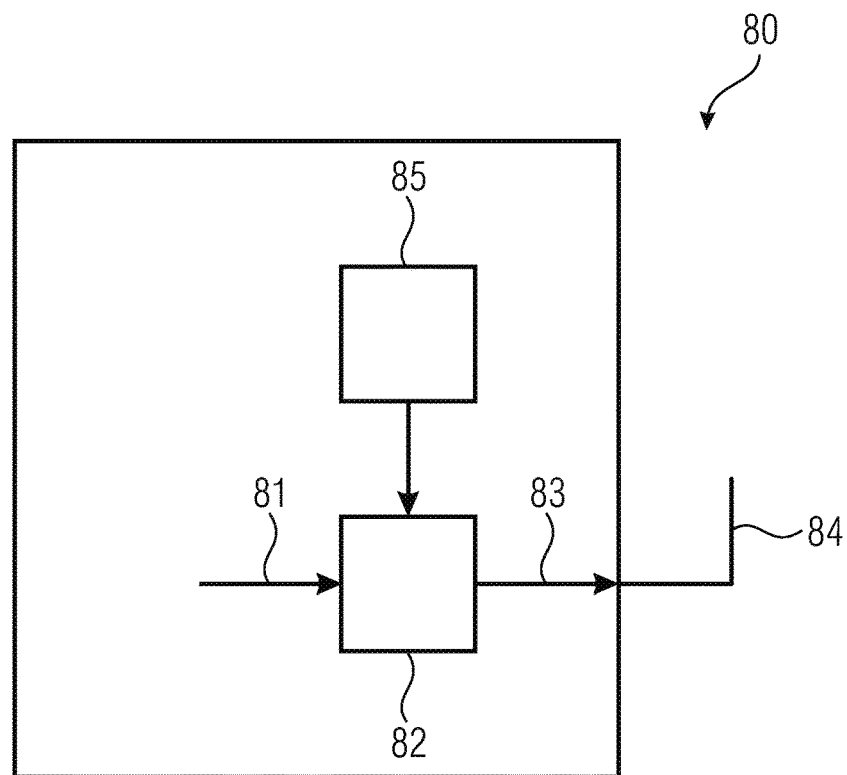
FIG. 8c is a schematic block diagram of an apparatus that is configured to adapt its channel leakage ratio according to an embodiment.

FIG. 8c is a schematic block diagram of an apparatus 80 that is configured to adapt its channel leakage ratio according to an embodiment. The apparatus 80 is configured to filter a signal to be transmitted with a digital filter 82 and to transmit an obtained filtered signal 83 using a wireless interface 84 such as an antenna. The apparatus 80 is configured to adapt the filter 82 using values or filter coefficients obtained from a lookup table 85. By adapting the filter coefficients, the apparatus 80 may be configured to adapt and reduce its channel leakage ratio. For example, the apparatus 80 is configured to implement three or more of the characteristics $132_1$ to $132_N$.

Figure 9:
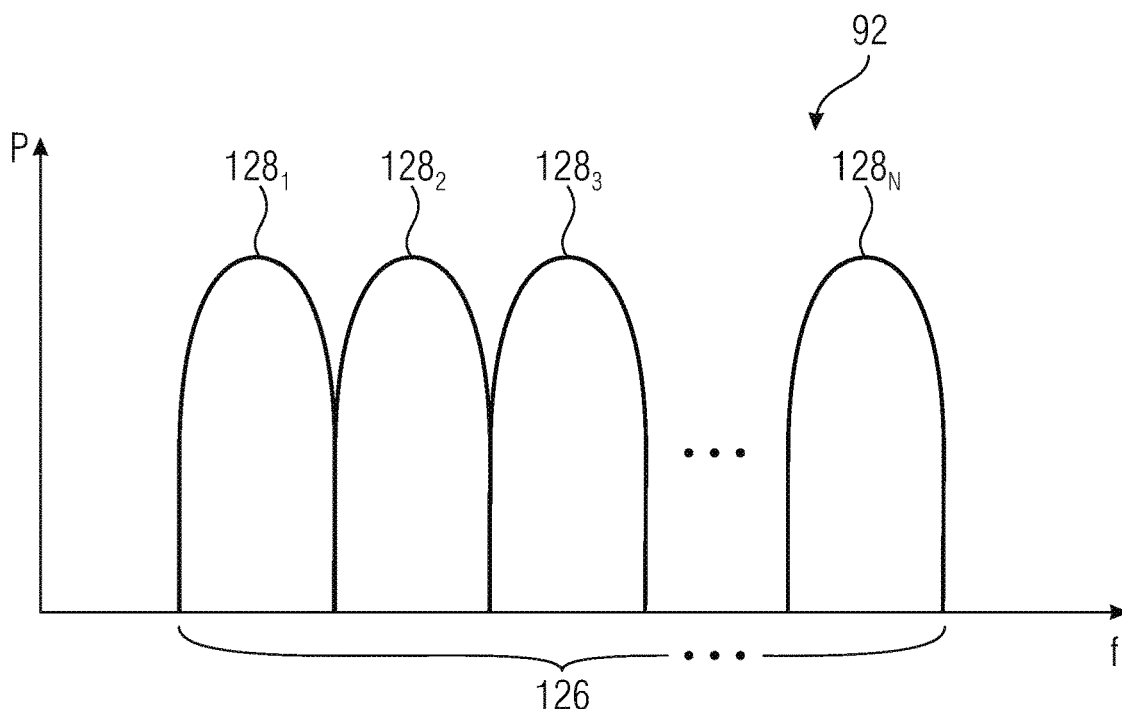
FIG. 9 is a schematic diagram of a frequency range of a guard band according to an embodiment.

FIG. 9 illustrates a schematic diagram of a frequency range 126 of an example guard band 92. The frequency range 126 may be divided into a number of N sub bands 128 that may have equal or different frequency widths. A value of N may be 1, 2, 3 or even more, for example 5. A base-station such as one of $eNB_1$ to $eNB_5$ may be configured to assign a first of the frequency ranges $128_1$ to $128_N$ to a first apparatus that has transmitted an indicator signal and may assign a different frequency range to a different apparatus. The different apparatus may transmit a data signal in the respective frequency range. Thus, the base-station may split the guard bands in a number of subbands and may assign each of the subbands $128_1$ to $128_N$ to different nodes. Alternatively or in addition, the base-station may be configured to assign at least two of the frequency ranges $128_1$ to $128_N$ to a first apparatus and at least one of the frequency ranges $128_1$ to $128_N$ to a different node.

In other words, an idea is to send a sweeping (cleaning) signal that may contain a valid control information on a narrow band channel. The narrow band channel may be designed so as to specifically coexist at or in the guard band of a primary transmission. The guard bands may sometimes be used for protecting from out-of-band leakage. The secondary user, i.e., a user using guard bands for transmission, will impulsively transmit in this guard band a sweeping signal as described therein. Announcement of the communication may allow for persistence transmission of important and/or critical NB-IoT/NB-mMTC (massive Machine Type Communication) devices in spontaneous and/or asynchronous fashion. The embodiments described therein allow for a coexistence with legacy wireless activities in a robust transmission fashion making the new radio (NR which stands for the 5G system and future wireless technology) possibly accommodate massive MTC/NB-IoT devices. A so-called primary user or legacy wireless device such as a base-station, a user equipment or an IoT device that is requested to reduce its channel leakage ratio may continuously monitor their sidebands for possible NB-IoT activities. This is not limited to a single 180 kHz. However, embodiments may use a guard band separation of a plurality of transmission bands. The apparatus may use an adaptive adjacent channel leakage ratio (ACLR) based on continuous activities on one or two of the sidebands (narrow bands), a primary user may decide to reduce its sidebands' activities. For example, there may be times during which there is no Narrow-Band transmission need. This may be advantageous, for relaxing the transmission waveform and reduces the filter, so do receiver equalizer, complexity. This may be obtained by inserting zeros in the frequency-domain and/or by using a lower roll-off factor (p) in the time-domain, i.e., to design the signal sharper in the frequency-domain. Once, the narrow band URLLC activities are monitored to be less or to have disappeared, the filter coefficients may be relaxed again and/or a total bandwidth may be consumed.

An NB-IoT/NB-mMTC device or a secondary user may transmit a side-band sweeping signal, i.e., an indicator signal. During an initial transmission, the secondary devices may continuously transmit a uniform burst transmission for a duration Tb, for example, in a number of 2, 3, 4, 5 or more or less subframes or slots. This may be understood that the device wants to send more urgent data. The apparatus may be configured to provide for the indicator signal so as to comprise control data. If a valid control or data information is transmit ted in this sweeping signal, it may face a high requirement when viewing at the robustness such that the signal may be transmitted with a low modulation coding scheme (MCS). After the sweeping signal is transmitted, transmission may be continued with an adaptive MCS, if need be. This may be performed in a way that the MCS and/or the information bitrate may be increased at least slightly after the primary devices have reduced their out-of-band leakage, i.e., the channel leakage ratio. After finishing the critical transmission period, the secondary devices may switch off their transmission, for example, once their transmission (TX)-buffer is partially or completely empty when assuming a full-buffer urgent case.

Some embodiments may assume that the collision channel is used without feedback. Transmission-critical NB-IoT devices may be controlled and/or may have their own multiple access scheme. Transmission-critical NB-IoT devices may be assumed to have their own access points or co-exist with the legacy devices such as eNBs/base-stations and/or access points. Transmission-critical NB-IoT devices may have a priori information about the guard band locations in the frequency spectrum, i.e., they may have knowledge about the guard bands that may be used for URLLC transmission. Primary users may use a generic wave-form transmission with flexible bandwidth carrying control data or user data and may have their own transmission moderators such as an eNB, a base-station and/or an access point. Primary and secondary networks and/or users may but do not necessarily have to cooperate.

Embodiments described herein may relate to a monitoring of the primary users sideband interference. It could be obtained by the one or more of the following. For example, the apparatus such as a UE and/or a base station or eNB may monitor or sense a level of interference in the narrow band (guard band and/or sideband) and may perform actions such as a modification of the selected coding scheme based on results of the monitoring. Monitoring may be performed during uplink and/or downlink so as to obtain reliable measurement data. Energy detection and/or eigenvalue detection and/or a cross-correlation or auto-correlation analysis may be performed to obtain information of activities in the sidebands. Depending on the cross-correlation index that is related to the narrow band signal and/or, if possible, for already filtered waveforms, a radio frequency (RF) or an intermediate frequency (IF) monitoring may be performed. The intermediate frequency may relate to a mean down-converting of the radio frequency into an intermediate one, i.e., before converting it to the processing base-band frequency.

A wave for ACLR adaptation that may even be waveform agnostic, may be used for nonfiltered waveforms such as orthogonal frequency division multiplex (OFDM) and long-term evaluation (LTE). Here, zeros insertions may be performed. In this case, also a pilot may be mooted. This may lead to a less accurate channel estimation at the sidebands, but allows for a low amount of interference therein. Otherwise, for example, for filtered/pulse-shaped waveforms an increase in the sharpness in the frequency range may be obtained by using a lower roll-off factor in the time-domain. After finishing URLLC transmission, the sharpness of the TTX filters may be relaxed or for example, for a less number of filter coefficients leading to lower computational complexity and/or power consumption which may have benefits, especially for battery-driven devices, more specifically for user terminals. Also, the sharpness may be relaxed for a better time-domain signal that may allow for an easier equalization and less inter-signal-interference (ISI). Furthermore, a better channel estimation near two bandwidth edges may be obtained, independent from (i.e., if or if not) zero-subcarriers are transmitted.

A signaling of legacy devices or terminals may be obtained in case of a downlink, by an eNB-base-station that takes care of the sweeping tone detection and a CLR deduction. I case of uplink (UL) the eNB may signal the user equipment about the existence of the URLLC narrow-band adjacent transmission. In case of uplink, the eNB may also signal the user about the detection period and the sweeping tone-period.

The indicator signal may be specified by a duration and/or by a used MCS of burst sweeping narrow-band transmission. The duration of the sweeping tone may be sufficiently large to be detected based on one or more of the detection schemes described herein. MCS for the burst sweeping tone may be used, for example, if it already carries a valid information. The MCS may be selected from the lowest MCS values with the lowest possible transmit block size (TBS). The indicator signal and/or the indicated data signal may be designed so as to have a defined waveform. For such a critical transmission, the waveform may be any possible filtered waveform, especially, not precluding legacy NB-IoT waveforms.

The sweeping signal, i.e., the indicator signal may carry data during the sweeping period, especially if needed, or may be transmitted without additional data. The data transmission may be similar to a legacy NB-IoT or other formats.

A bandwidth of a critical transmission of a narrow-band signal may be designed based on existing guard bands. The legacy NB-IoT bandwidth may be in the order of 180 kHz. However, smaller or wider narrow-band definitions may be used and shall not be precluded. If the guard bands are wider than the selected narrow-band signal, more than one transmission may be granted, for example, by the base-station. If the guard bands are wider than the selected narrow-band signal, frequency hopping may be supported. Hence, a longer detection period may be allowed by the base-station.

A signaling of the narrow-band devices may be performed based on the narrow-band devices/terminals that are supposed to have or receive signaling information about the guard intervals. The narrow-band devices/terminals may receive information about the sweeping period, for example, from the base-station. Embodiments described herein may be used for latency-constraint or transmission-critical communication services, multi-level quality of service (QoS), narrow-band IoT devices, mMTC, ultra-reliable communication, enhanced multiple access (MA) scheme and medium access control (MAC).

Ideas described herein comprise specifications for narrow-band devices and for so-called primary users. A narrow-band device may allow for a persistence transmission of ultra-reliable/critical narrow-band devices coexisting with primary wide-band systems. Using a sweeping tone, narrow-band devices may continuously transmit, for a period of time, a sweeping narrow-band tone inside the guard bands of the legacy system. If data/control is contained therein, then a significantly low MCS may be selected. The data transmission may be performed afterwards and may be performed by continuing transmission with an adaptive MCS core if need be, even higher after the primary devices have reduced their out-of-band leakage. After that, transmission may be mooted, i.e., the secondary devices may switch of their transmission. The primary users may continuously monitor their side-bands for possible URLLC NB-IoT activities. For detection, the monitoring may be used with different detection schemes. An adaptive adjacent channel leakage ratio (ACLR) may be used based on continuous activities on one or two of the sidebands. When no URLLC activity is detected, once the NB-URLLC activities are monitored to be less, the filter coefficients may be relaxed again or total bandwidth may be consumed.

Figure 10:
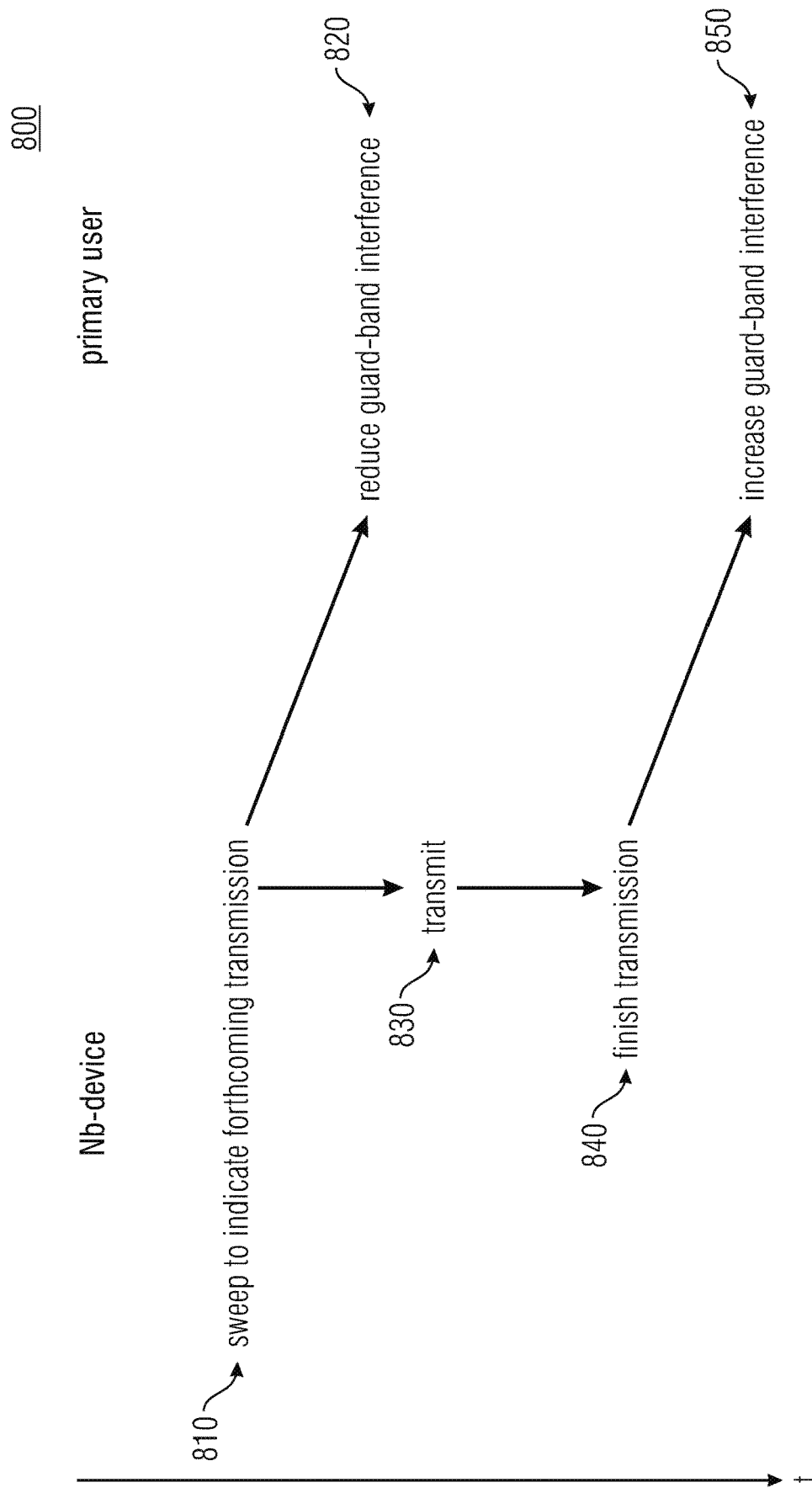
FIG. 10 is a schematic flowchart of a method for operating narrow-band devices that aim to securely transmit in narrow bands and of primary users and according to an embodiment.

FIG. 10 shows a schematic flowchart of a method 800 that illustrates the operation of narrow-band devices that aim to securely transmit in narrow bands and of primary users. In a step 810, an apparatus configured to operate in a wireless communications network cell that is operated so as to provide a first transmission band such as band $90_2$ and a second transmission band such as band $90_3$ being separated by a narrow band such as $90_2$ sweeps an indicator signal to indicate forthcoming transmission, i.e., it transmits an indicator signal in the frequency band prior to transmitting a data signal so as to indicate the transmission of the data signal. Responsive hereto, the primary user reduces its channel leakage ratio, i.e., its guard band interference in a step 820. In a step 830, the NB-device transmits its data signal using the frequency band comprising the center frequency that is part of the narrow band. In a step 840, the NB-device finishes transmission. Based thereon and responsive hereto, the primary user may increase its guard band interference in a step 850.

Further embodiments are now described.

A $1^{st}$ embodiment provides an apparatus ($UE_1$-$UE_5$; 104; $eNB_1$-$eNB_5$) configured to operate in a wireless communications network cell ($100_1$-$100_5$) that is operated so as to provide a first transmission band ($90_2$) and a second transmission band ($90_3$) being separated by a narrow band ($92_1$); wherein the apparatus is configured to transmit a data signal ($98_2$) using a frequency band ($128_1$-$128_N$) comprising a center frequency, wherein the center frequency is a frequency of the narrow band ($92_1$); and wherein the apparatus is configured to transmit an indicator signal ($94_2$) in the frequency band ($128_1$-$128_N$) prior to transmitting the data signal ($98_2$) so as to indicate the transmission of the data signal ($98_2$).

A $2^{nd}$ embodiment provides the apparatus of the $1^{st}$ embodiment, wherein the narrow band ($90_2$) is one of a plurality of narrow bands ($90_1$, $90_2$) in the wireless communications network cell ($100_1$-$100_5$), wherein the apparatus is configured to transmit the indicator signal ($94_2$) in the plurality of narrow bands ($90_1$, $90_2$).

A $3^{rd}$ embodiment provides the apparatus of the $1^{st}$ or $2^{nd}$ embodiment, wherein the narrow band ($90_2$) is one of a plurality of narrow bands ($90_1$, $90_2$) in the wireless communications network cell ($101_1$-$100_5$), wherein the apparatus is configured to select one of the plurality of narrow bands ($90_1$, $90_2$) for transmission of the data signal ($98_2$) and to transmit the indicator signal ($94_2$) in the selected narrow band whilst not transmitting the indicator signal in a different narrow band of the plurality of narrow bands ($90_1$, $90_2$).

A $4^{th}$ embodiment provides the apparatus of one of the previous embodiments, wherein the apparatus is configured to code the indicator signal (94) with a first modulation coding scheme comprising a first information bitrate and to code the data signal (98) with a second modulation coding scheme comprising a second information bitrate.

A $5^{th}$ embodiment provides the apparatus of one of the previous embodiments, wherein the apparatus is configured to monitor a level of interference in the narrow band.

A $6^{th}$ embodiment provides the apparatus of one of the previous embodiments, wherein the apparatus is configured to transmit the indicator signal ($94_2$) responsive to a transmission query received from an application of the apparatus, the transmission query indicating a requested transmission of data, wherein the apparatus is configured to deactivate the transmission in the narrow band ($92_1$) after the transmission of the data signal.

A $7^{th}$ embodiment provides the apparatus of one of the previous embodiments, wherein the apparatus is configured to reduce a channel leakage ratio to one value of at least three values, the channel leakage ratio indicating a signal power (P) of a transmitted signal in the narrow band ($92_1$) responsive to having determined a presence of an indicator signal ($94_2$) in the narrow band.

An $8^{th}$ embodiment provides an apparatus ($UE_1$-$UE_5$; 104; $eNB_1$-$eNB_5$) configured to operate in a wireless communications network that is operated so as to provide a first transmission band ($90_2$) and a second transmission band ($90_3$) being separated by a narrow band ($92_1$); wherein the apparatus is configured to reduce a channel leakage ratio to one value of at least three values, the channel leakage ratio indicating a signal power (P) of a transmitted signal in the narrow band ($92_1$) responsive to having determined a presence of an indicator signal ($94_2$) in the narrow band.

A $9^{th}$ embodiment provides the apparatus of the $8^{th}$ embodiment, wherein the apparatus is configured to transmit a transmission signal ($96_1$) in the second transmission band ($90_2$) using a first channel leakage ratio indicating a signal power (P) of the transmitted signal ($96_1$) in the narrow band; and responsive to having determined the presence of the indicator signal ($94_1$) in the narrow band ($92_1$), to transmit in the second transmission band ($90_2$) using a second channel leakage ratio having a lower non-zero signal power (P) in the narrow band ($92_2$) than the first channel leakage ratio.

A $10^{th}$ embodiment provides the apparatus of one of the $8^{th}$ or $9^{th}$ embodiments, wherein the apparatus is configured to extract control data from the indicator signal ($94_1$) and to implement instructions indicated by the control data.

An $11^{th}$ embodiment provides the apparatus of one of the $8^{th}$ to $10^{th}$ embodiments, wherein the apparatus is configured to receive information from a base station ($eNB_1$-$eNB_5$), the information indicating a resource element of the wireless communications network, wherein the apparatus is configured to reduce the channel leakage ratio for the indicated resource element based on the information.

A $12^{th}$ embodiment provides the apparatus of one of the $8^{th}$ to $11^{th}$ embodiments, wherein the apparatus is configured to transmit a data signal ($98_2$) using a frequency band ($128_1$-$128_N$) comprising a center frequency, wherein the center frequency is a frequency of the narrow band ($92_1$); wherein the apparatus is configured to transmit an indicator signal ($94_2$) in the frequency band ($128_1$-$128_N$) prior to transmitting the data signal ($98_2$) so as to indicate the transmission of the data signal ($98_2$).

A $13^{th}$ embodiment provides a base station (eNB$_1$-eNB$_5$) configured to operate a wireless communications network cell so as to provide a first transmission band ($90_2$) and a second transmission band ($90_3$) being separated by a narrow band ($92_2$); wherein the base station is configured to receive an indicator signal ($94_1$) in the narrow band ($92_2$) and to transmit data to an apparatus that is operated to transmit a signal ($96_2$) in the second transmission band ($90_2$), the data indicating that the apparatus is requested to reduce a channel leakage ratio indicating a signal power (P) of the transmitted signal ($96_2$) in the narrow band ($92_2$).

A $14^{th}$ embodiment provides the base station of the $13^{th}$ embodiment, wherein the indicator signal ($94_2$) comprises information indicating a request for transmitting a first data signal ($98_2$) in a first frequency range ($128_1$-$128_N$) of the narrow band ($92_2$), wherein the base station is configured to assign the first frequency range ($128_1$-$128_N$) to a first apparatus transmitting the indicator signal ($94_2$) and to assign a second frequency range ($128_1$-$128_N$) of the narrow band ($94_2$) to a second apparatus for transmission of a second data signal.

A $15^{th}$ embodiment provides the base station of the $13^{th}$ or $14^{th}$ embodiments, wherein the apparatus is configured to monitor a level of interference in the narrow band.

A $16^{th}$ embodiment provides a wireless communications network comprising an apparatus (UE$_1$-UE$_5$; 104; eNB$_1$-eNB$_5$) according to one of the $1^{st}$ to $11^{th}$ embodiments, being a first apparatus; and an apparatus (UE$_1$-UE$_5$; 104; eNB$_1$-eNB$_5$) according to one of the $12^{th}$ to $15^{th}$ embodiments, being a second apparatus.

A $17^{th}$ embodiment provides the wireless communications network of the $16^{th}$ embodiment, wherein the second apparatus is configured to reduce the channel leakage ratio responsive to the indicator signal received from the first apparatus or responsive to a signal received from a base station of the wireless communications network indicating a reception of the indicator signal.

An $18^{th}$ embodiment provides a method (800) for operating an apparatus in a wireless communications network cell that is operated so as to provide a first transmission band and a second transmission band being separated by a narrow band, the method comprising: transmitting (830) a data signal using a frequency band comprising a center frequency, wherein the center frequency is a frequency of the narrow band; transmitting (810) an indicator signal in the frequency band prior to transmitting the data signal so as to indicate the transmission of the data signal.

A $19^{th}$ embodiment provides a method for operating an apparatus in a wireless communications network that is operated so as to provide a first transmission band and a second transmission band being separated by a narrow band, the method comprising: reducing (820) a channel leakage ratio to one value of at least three values, the channel leakage ratio indicating a signal power of a transmitted signal in the narrow band responsive to having determined a presence of an indicator signal in the narrow band.

A $20^{th}$ embodiment provides a method for operating a base station so as to operate a wireless communications network cell so as to provide a first transmission band and a second transmission band being separated by a narrow band, the method comprising: receiving an indicator signal in the narrow band and transmitting data to an apparatus that is operated to transmit a signal in the second transmission band, the data indicating that the apparatus is requested to reduce a channel leakage ratio indicating a signal power of the transmitted signal in the narrow band.

A $21^{st}$ embodiment provides a non-transitory computer program product comprising a computer readable medium storing instructions which, when executed on a computer, carry out the method of one of the $18^{th}$ to $20^{th}$ embodiments.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus configured to operate in a wireless communications network cell that is operated so as to provide a first transmission band and a second transmission band being separated by a narrow band; or wherein the narrow band is arranged adjacent to the first or second transmission band;
- wherein the apparatus is configured to transmit a data signal in the narrow band using a frequency band comprising frequencies of the narrow band;
- wherein the apparatus is configured to transmit an indicator signal in the frequency band prior to transmitting the data signal so as to indicate the transmission of the data signal; and
- the apparatus being a base station, wherein the apparatus is configured to configure a channel leakage ratio reduction of a first apparatus, by sideband reduction or zero-insertion, to the first apparatus to be used by a second apparatus; or
- wherein the apparatus is further configured to transmit the data signal in the transmission band of the wireless communication network by use of Adjacent Channel Leakage Ratio decaying into an adjacent narrow band; wherein the apparatus is con-figured to reduce a channel leakage ratio to one value of at least two or three values, the channel leakage ratio indicating a signal power of a transmitted signal in the adjacent narrow band responsive to having determined a presence of a further indicator signal in a further narrow band, wherein determining the presence of the further indicator signal comprises a reception of the further indicator signal with the apparatus and/or comprises reception of data with the apparatus, the data indicating the reception of the further indicator signal by a further apparatus.

2. The apparatus of claim 1, wherein the narrow band is one of a plurality of narrow bands in the wireless communications network cell, wherein the apparatus is configured to transmit the indicator signal in the plurality of narrow bands.

3. The apparatus of claim 1, wherein the narrow band is one of a plurality of narrow bands in the wireless communications network cell, wherein the apparatus is configured to select one of the plurality of narrow bands for transmission of the data signal and to transmit the indicator signal in the selected narrow band whilst not transmitting the indicator signal in a different narrow band of the plurality of narrow bands.

4. The apparatus of claim 1, wherein the apparatus is configured to code the indicator signal with a first modulation coding scheme comprising a first information bitrate and to code the data signal with a second modulation coding scheme comprising a second information bitrate.

5. The apparatus of claim 1, wherein the apparatus is configured to monitor a level of interference in the narrow band.

6. The apparatus of claim 1, wherein the apparatus is configured to transmit the indicator signal responsive to a transmission query received from an application of the apparatus, the transmission query indicating a requested transmission of data, wherein the apparatus is configured to deactivate the transmission in the narrow band after the transmission of the data signal.

7. The apparatus of claim 1, wherein the apparatus is configured for transmitting, after sending the indicator signal, a coded data to another apparatus in the said narrow band.

8. The apparatus of claim 1, wherein the apparatus is further configured to transmit a data signal in a transmission band of the wireless communication network by use of Adjacent Channel Leakage Ratio decaying into an adjacent narrow band; wherein the apparatus is configured to reduce a channel leakage ratio to one value of at least two or three values, the channel leakage ratio indicating a signal power of a transmitted signal in the adjacent narrow band responsive to having determined a presence of a further indicator signal in a further narrow band, wherein determining the presence of the further indicator signal comprises a reception of the further indicator signal with the apparatus and/or comprises reception of data with the apparatus, the data indicating the reception of the further indicator signal by a further apparatus, wherein the apparatus is configured for adapting a filter characteristic using an adaption or reduction of a roll-off factor in the time domain to reduce the channel leakage ratio.

9. The apparatus of claim 1, wherein the apparatus is further configured to transmit a data signal in a transmission band of the wireless communication network by use of Adjacent Channel Leakage Ratio decaying into an adjacent narrow band; wherein the apparatus is configured to reduce a channel leakage ratio to one value of at least two or three values, the channel leakage ratio indicating a signal power of a transmitted signal in the adjacent narrow band responsive to having determined a presence of a further indicator signal in a further narrow band, wherein determining the presence of the further indicator signal comprises a reception of the further indicator signal with the apparatus and/or comprises reception of data with the apparatus, the data indicating the reception of the further indicator signal by a further apparatus, wherein the apparatus is configured to insert ZERO-values into transmitted signals to reduce the channel leakage ratio.

10. An apparatus configured to operate in a wireless communications network that is operated so as to provide a first transmission band and a second transmission band being separated by a narrow band; or wherein the narrow band is arranged adjacent to the first or second transmission band;
- wherein the apparatus is configured to reduce a channel leakage ratio to one value of at least two or three values, the channel leakage ratio indicating a leakage of signal power from the first or second transmission band to the narrow band responsive to having determined a presence of an indicator signal in the narrow band.

11. The apparatus of claim 10, wherein to reduce the channel leakage ratio, the apparatus is configured for adapting a filter characteristic using an adaption or reduction of a roll-off factor in the time domain.

12. The apparatus of claim 10, wherein the apparatus is configured to insert ZERO-values into transmitted signals to reduce the channel leakage ratio.

13. The apparatus of claim 10, wherein the apparatus is configured to transmit a transmission signal in the second transmission band using a first channel leakage ratio indicating a signal power of the transmission signal in the narrow band prior to having determined the presence of the indicator signal in the narrow band; and responsive to having determined the presence of the indicator signal in the narrow band, to transmit in the second transmission band using a second channel leakage ratio having a lower non-zero signal power in the narrow band than the first channel leakage ratio.

14. The apparatus of claim 10, wherein the apparatus is configured to extract control data from the indicator signal and to implement instructions indicated by the control data.

15. The apparatus of claim 10, wherein the apparatus is configured to receive information from a base station, the information indicating a frequency of the a resource element of the wireless communications network, wherein the apparatus is configured to reduce the channel leakage ratio for the indicated resource element based on the information.

16. The apparatus of claim 10, wherein the apparatus is configured to transmit the data signal in the narrow band using the frequency band comprising frequencies of the narrow band;
   wherein the apparatus is configured to transmit a further indicator signal in the frequency band prior to transmitting the data signal so as to indicate the transmission of the data signal.

17. A base station configured to operate a wireless communications network cell so as to provide a first transmission band and a second transmission band being separated by a narrow band; or wherein the narrow band is arranged adjacent to the first or second transmission band;
   wherein the base station is configured to receive an indicator signal in the narrow band and to transmit data to an apparatus that is operated to transmit a signal in the second transmission band, the data indicating that the apparatus is requested to reduce a channel leakage ratio indicating a signal power of the transmitted signal in the narrow band.

18. The base station of claim 17, wherein the indicator signal comprises information indicating a request of a requesting apparatus for transmitting a first data signal in a first frequency band of the narrow band, wherein the base station is configured to assign the first frequency band to the requesting apparatus having transmitted the indicator signal and to assign a second frequency band of the narrow band to a different apparatus for transmission of a second data signal.

19. The base station of claim 17, wherein the apparatus is configured to monitor a level of interference in the narrow band.

20. A wireless communications network comprising:
   an apparatus configured to operate in a wireless communications network cell that is operated so as to provide a first transmission band and a second transmission band being separated by a narrow band; or wherein the narrow band is arranged adjacent to the first or second transmission band;
   wherein the apparatus is configured to transmit a data signal in the narrow band using a frequency band comprising frequencies of the narrow band;
   wherein the apparatus is configured to transmit an indicator signal in the frequency band prior to transmitting the data signal so as to indicate the transmission of the data signal,
   configured to operate in a wireless communications network that is operated so as to provide a first transmission band and a second transmission band being separated by a narrow band; or wherein the narrow band is arranged adjacent to the first or second transmission band; wherein the apparatus is configured to reduce a channel leakage ratio to one value of at least two or three values, the channel leakage ratio indicating a leakage of signal power from the first or second transmission band to the narrow band responsive to having determined a presence of an indicator signal in the narrow band, wherein the apparatus is configured to transmit the data signal in the narrow band using the frequency band comprising frequencies of the narrow band; wherein the apparatus is configured to transmit a further indicator signal in the frequency band prior to transmitting the data signal so as to indicate the transmission of the data signal
   being a first apparatus; and
   a base station configured to operate a wireless communications network cell so as to provide a first transmission band and a second transmission band being separated by a narrow band; or wherein the narrow band is arranged adjacent to the first or second transmission band;
   wherein the base station is configured to receive an indicator signal in the narrow band and to transmit data to an apparatus that is operated to transmit a signal in the second transmission band, the data indicating that the apparatus is re-quested to reduce a channel leakage ratio indicating a signal power of the transmitted signal in the narrow band, being a first base station;
   wherein the first base station is configured to reduce a channel leakage ratio responsive to the indicator signal received from the first apparatus or responsive to a signal received from a second base station of the wireless communications network indicating a reception of the indicator signal.

21. The wireless communications network of claim 20, comprising:
   a further apparatus configured to operate in the wireless communications network cell that is operated so as to provide the first transmission band and the second transmission band being separated by the narrow band; or wherein the narrow band is arranged adjacent to the first or second transmission band;
   wherein the apparatus is configured to transmit the data signal in the narrow band using a frequency band comprising frequencies of the narrow band;
   wherein the apparatus is configured to transmit the indicator signal in the frequency band prior to transmitting the data signal so as to indicate the transmission of the data signal,
   or an apparatus according to claim 16,
   being a second apparatus;
   wherein the first apparatus is configured for transmitting the indicator signal, wherein the base station is configured for evaluating the indicator signal for its presence and/or for information comprised therein and for instructing the second apparatus so as to reduce a channel leakage ratio to one value of at least two or three values.

22. The wireless communications network of claim 20, wherein to reduce the channel leakage ratio, the base station is configured for adapting a filter characteristic using an adaption or reduction of a roll-off factor in the time domain.

23. The wireless communications network of claim 20, wherein to reduce the channel leakage ratio, the base station is configured to insert ZERO-values into transmitted signals.

24. A method for operating an apparatus in a wireless communications network cell that is operated so as to provide a first transmission band and a second transmission band being separated by a narrow band, or wherein the narrow band is arranged adjacent to the first or second transmission band, the method comprising:

transmitting a data signal in the narrow band using a frequency band comprising frequencies of the narrow band;

transmitting an indicator signal in the frequency band prior to transmitting the data signal so as to indicate the transmission of the data signal;

the apparatus being a base station, such that the apparatus configures an channel leakage ratio reduction of a first apparatus, by sideband reduction or zero-insertion, to the first apparatus to be used by a second apparatus; or the apparatus transmits the data signal in the transmission band of the wireless communication network by use of Adjacent Channel Leakage Ratio decaying into an adjacent narrow band; such that the apparatus reduces a channel leakage ratio to one value of at least two or three values, the channel leakage ratio indicating a signal power of a transmitted signal in the adjacent narrow band responsive to having determined a presence of a further indicator signal in a further narrow band, such that determining the presence of the further indicator signal comprises a reception of the further indicator signal with the apparatus and/or comprises reception of data with the apparatus, the data indicating the reception of the further indicator signal by a further apparatus.

25. A method for operating an apparatus in a wireless communications network that is operated so as to provide a first transmission band and a second transmission band being separated by a narrow band, or wherein the narrow band is arranged adjacent to the first or second transmission band, the method comprising:

reducing a channel leakage ratio to one value of at least two values, the channel leakage ratio indicating a leakage of signal power from the first or second transmission band to the narrow band responsive to having determined a presence of an indicator signal in the narrow band.

26. A method for operating a base station so as to operate a wireless communications network cell so as to provide a first transmission band and a second transmission band being separated by a narrow band, or wherein the narrow band is arranged adjacent to the first or second transmission band, the method comprising:

receiving an indicator signal in the narrow band and transmitting data to an apparatus that is operated to transmit a signal in the second transmission band, the data indicating that the apparatus is requested to reduce a channel leakage ratio indicating a signal power of the transmitted signal in the narrow band.

27. A non-transitory digital storage medium having a computer program stored thereon to perform the methods 28 to 30 when said computer program is run by a computer.

* * * * *